US012660003B2

(12) United States Patent
Li et al.

(10) Patent No.: US 12,660,003 B2
(45) Date of Patent: Jun. 16, 2026

(54) FIRST MESSAGE DIFFERENTIATION IN CBRA PROCEDURE

(71) Applicant: Telefonaktiebolaget LM Ericsson (publ), Stockholm (SE)

(72) Inventors: Jingya Li, Gothenburg (SE); Zhipeng Lin, Nanjing (CN); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 408 days.

(21) Appl. No.: 17/920,988

(22) PCT Filed: Apr. 28, 2021

(86) PCT No.: PCT/EP2021/061142
§ 371 (c)(1),
(2) Date: Oct. 24, 2022

(87) PCT Pub. No.: WO2021/219723
PCT Pub. Date: Nov. 4, 2021

(65) Prior Publication Data
US 2023/0199859 A1      Jun. 22, 2023

(30) Foreign Application Priority Data

Apr. 29, 2020    (WO) ................ PCT/CN2020/087779

(51) Int. Cl.
*H04W 74/0833* (2024.01)
*H04W 74/08* (2009.01)
(Continued)

(52) U.S. Cl.
CPC ... *H04W 74/0841* (2013.01); *H04W 74/0833* (2013.01); *H04W 74/0875* (2013.01); *H04W 74/0836* (2024.01); *H04W 74/0838* (2024.01)

(58) Field of Classification Search
CPC ......... H04W 74/0841; H04W 74/0875; H04W 74/0836; H04W 74/0838; H04W 74/0833; H04W 4/70; H04W 48/16
See application file for complete search history.

(56) References Cited

U.S. PATENT DOCUMENTS

| | | | |
|---|---|---|---|
| 9,426,828 B1 | 8/2016 | Singh et al. | |
| 2013/0242730 A1* | 9/2013 | Pelletier | H04L 5/0053 |
| | | | 370/230 |

(Continued)

FOREIGN PATENT DOCUMENTS

| | | |
|---|---|---|
| CN | 101043256 A | 9/2007 |
| CN | 103733713 A | 4/2014 |

(Continued)

OTHER PUBLICATIONS

International Search Report and Written Opinion issued in International Application No. PCT/EP2021/061142, dated Jul. 19, 2021 (15 pages).
International Preliminary Report on Patentability issued in International Application No. PCT/EP2021/061142, dated Jul. 19, 2022 (27 pages).

(Continued)

*Primary Examiner* — Dady Chery
(74) *Attorney, Agent, or Firm* — Rothwell, Figg, Ernst & Manbeck, P.C.

(57) ABSTRACT

For a random access procedure (e.g., 2-step RACH and/or 4-step RACH), a network node may configure different physical random access preamble configurations (e.g., different PRACH occasions, preamble indexes, or preamble formats) for different user equipment (UE)/service groups that are associated with different UE priorities, UE types, service priorities, service types, and/or network slices. A UE may select a configuration to use to transmit the random access preamble based on the priority of the UE, the type of the UE, the priority of the service, the type of the service, and/or the network slice. In 2-step RACH, a network node may also configure different msgA PUSCH resources for (Continued)

different UE priorities, UE types, service priorities, service types, and/or network slices. The UE may transmit the random access preamble in accordance with the selected PRACH configuration as part of a contention based random access procedure.

20 Claims, 18 Drawing Sheets

(51) Int. Cl.
  *H04W 74/0836*     (2024.01)
  *H04W 74/0838*     (2024.01)

(56)               References Cited

U.S. PATENT DOCUMENTS

| | | | |
|---|---|---|---|
| 2016/0174237 A1 | 6/2016 | Zhao et al. | |
| 2018/0184460 A1 | 6/2018 | Hou et al. | |
| 2020/0037297 A1* | 1/2020 | Pan ..................... | H04W 72/044 |

FOREIGN PATENT DOCUMENTS

| | | |
|---|---|---|
| CN | 104488346 A | 4/2015 |
| CN | 105594285 A | 5/2016 |
| CN | 106413117 A | 2/2017 |
| CN | 109890083 A | 6/2019 |
| JP | 2019121953 A | 7/2019 |
| WO | 2019063321 A1 | 4/2019 |

OTHER PUBLICATIONS

3GPP TS 38.213 V16.1.0, "3rd Generation Partnership Project; Technical Specification Group Radio Access Network; NR; Physical layer procedures for control (Release 16)", 3GPP Standard; Technical Specification; 3rd Generation Partnership Project (3GPP), Apr. 3, 2020, (pp. 1-156).

Ericsson, "Procedure for Two-step RACH", 3GPP TSG-RAN WG1 Meeting #98, R1-1910907, Chongqing, China, Oct. 14-18, 2019, (21 pages).

3GPP TS 38.211 V16.9.0 "3rd Generation Partnership Project; Technical Specification Group Radio Access Network; NR; Physical channels and modulation (Release 16)", 3GPP Standard; Technical Specification; 3rd Generation Partnership Project (3GPP), Mar. 2022, (134 pages).

3GPP TS 38.321 V17.1.0 "3rd Generation Partnership Project; Technical Specification Group Radio Access Network; NR; Medium Access Control (MAC) protocol specification (Release 17)", 3GPP Standard; Technical Specification; 3rd Generation Partnership Project (3GPP), Jun. 2022, (241 pages).

3GPP TS 38.331 V17.1.0 "3rd Generation Partnership Project; Technical Specification Group Radio Access Network; NR; Radio Resource Control (RRC) protocol specification (Release 17)", 3GPP Standard; Technical Specification; 3rd Generation Partnership Project (3GPP), Jun. 2022, (1273 pages).

Nokia Shanghai Bell, "Preamble groups for 2-step RACH", 3GPP TSG-RAN WG2 Meeting #107bis, R2-1913221, SID. NR_2step_RACH-Core—Release 16, Chongquing, China, Oct. 14-18, 2019, 3 pages.

* cited by examiner

Example:
— #SSBs-per-PRACH-occasion = 4
— #CB-preambles-per-SSB = 4
— #msgA-CB-PreamblesPerSSB = 2

The 64 preambles configured for the cell (per PRACH occasion)

Map to SSB 0    SSB 1    SSB 2    SSB 3

0 1    16    32    48    63

■ = Preamble indices for CBRA 4-step RACH
□ = Preamble indices for CFRA 4-step RACH
▥ = Preamble indices for CBRA 2-step RACH

FIRST MESSAGE DIFFERENTIATION IN CBRA PROCEDURE

CROSS REFERENCE TO RELATED APPLICATION

This application is a 35 U.S.C. § 371 National Phase Entry Application from PCT/EP2021/061142, filed Apr. 28, 2021, designating the United States, which claims priority to PCT/CN2020/087779, filed Apr. 29, 2020, the disclosures of which are incorporated herein by reference in their entirety.

TECHNICAL FIELD

This disclosure relates to apparatuses, methods, and systems for random access procedures. Some aspects of this disclosure relate to first and second physical random access channel (PRACH) configurations that enable differentiated admission control based on a user equipment (UE) priority, a UE type, a service priority, a service type, and/or a network slice.

BACKGROUND

1.1. New Radio Initial Access

The New Radio (NR) (a.k.a. 5G or Next Generation (NG)) architecture may include one or more of a user equipment (UE) and a network node (e.g., an NG NodeB (gNB)). The network node may be a 5G node. Before the user equipment (UE) can properly communicate within a network, the UE must carry out a cell search to find, synchronize, and identify a cell. After finding, synchronizing, and identifying a cell, the UE can acquire basic system information and perform a random access procedure to establish a connection to the cell.

1.1.1. NR Cell Search and System Information Acquisition

In NR, the combination of synchronization signals (SS) and physical broadcast channel (PBCH) is referred to as an SS/PBCH block (SSB). Similar to Long Term Evolution (LTE), a pair of SS, primary synchronization signal (PSS) and secondary synchronization signal (SSS), is periodically transmitted on downlink from each cell to allow a UE to initially access to the network. By detecting SS, a UE can obtain the physical cell identity, achieve downlink synchronization in both time and frequency, and acquire the timing for PBCH. PBCH carries the master information block (MIB), which contains minimum system information that a UE needs to acquire system information block 1 (SIB 1). SIB1 carries the remaining minimum system information that is needed for a UE to be able to perform a subsequent random-access procedure.

1.1.2. NR 4-Step Random Access Procedure

The 4-step random access procedure, also referred to as Type-1 random access procedure in Technical Specification (TS) 38.213, is illustrated in FIG. 1. In the first step, a UE 102 initiates the random-access procedure by transmitting in uplink (UL) a random-access preamble (called Msg 1) on a physical random-access channel (PRACH). After detecting the Msg1, a network node 104 (e.g., gNB) will respond by transmitting in downlink (DL) a random-access response (RAR) on a physical downlink shared channel (PDSCH)

(called Msg2). In the third step, after successfully decoding Msg2, the UE 102 continues the procedure by transmitting in UL a physical uplink shared channel (PUSCH) (called Msg3) for terminal identification and Radio Resource Control (RRC) connection establishment request. In the last step of the procedure, the network node 104 transmits in DL a PDSCH (called Msg4) for contention resolution. There can be cases that multiple UEs select the same random-access preamble and transmit the preamble on the same PRACH time/frequency resource. This preamble collision is called contention. One of the main purposes of Steps 3 and 4 of the 4-step random access procedure is to resolve such potential contention.

1.1.3. NR 2-Step Random Access Procedure

The 2-step random access procedure, also referred to as Type-2 random access procedure in TS 38.213, is illustrated in FIG. 2. In the first step, a UE 102 sends a message A (MsgA) including a random access preamble together with higher layer data such as an RRC connection request and possibly with some small payload on PUSCH. In the second step, after detecting the MsgA, the network node 104 sends a RAR (called message B) including UE identifier assignment, timing advance information, and contention resolution message etc.

1.2. NR Rel-15 PRACH Configuration

In NR, the time and frequency resource on which a random-access preamble (Msg 1) is transmitted is defined as a PRACH occasion.

The time resources and preamble format for the Msg1 transmission is configured by a PRACH configuration index, which indicates a row in a PRACH configuration table specified in TS 38.211 Tables 6.3.3.2-2, 6.3.3.2-3, 6.3.3.2-4 for FR1 paired spectrum, FR1 unpaired spectrum, and FR2 with unpaired spectrum, respectively.

Part of the Table 6.3.3.2-3 for FR1 unpaired spectrum for preamble format 0 is copied in Table 1 below, where the value of x indicates the PRACH configuration period in number of system frames. The value of y indicates the system frame within each PRACH configuration period on which the PRACH occasions are configured. For instance, if y is set to 0, then, it means PRACH occasions only configured in the first frame of each PRACH configuration period. The values in the column "subframe number" tells on which subframes are configured with PRACH occasion. The values in the column "starting symbol" is the symbol index In case of time division duplex (TDD), semi-statically configured DL parts and/or actually transmitted SSBs can override and invalidate some time-domain PRACH occasions defined in the PRACH configuration table. More specifically, PRACH occasions in the UL part are always valid, and a PRACH occasion within the X part is valid as long as (i) it does not precede or collide with an SSB in the RACH slot and (ii) it is at least N symbols after the DL part and the last symbol of an SSB. N is 0 or 2 depending on PRACH format and subcarrier spacing.

TABLE 1

| PRACH Configuration Index | Preamble format | $n_{SFN}$ mod x = y x | y | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | | | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

PRACH configuration for preamble format 0 for FR1 unpaired spectrum

In the frequency domain, NR supports multiple frequency-multiplexed PRACH occasions on the same time-domain PRACH occasion. This is mainly motivated by the support of analog beam sweeping in NR such that the PRACH occasions associated to one SSB are configured at the same time instance but different frequency locations. The starting position in the frequency is indicated by the higher-layer parameter msg1-FrequencyStart in SIB1, and the number of consecutive PRACH occasions frequency division multiplexed (FDMed) in one time instance is configured by the higher-layer parameter msg1-FDM in SIB1. The number of PRACH occasions FDMed in one time domain PRACH occasion, can be 1, 2, 4, or 8.

Here the msg1-FDM and msg1-FrequencyStart are defined in 3GPP TS 38.331 as below:

msg1-FDM: The number of PRACH transmission occasions FDMed in one time instance.

msg1-FrequencyStart: Offset of lowest PRACH transmission occasion in frequency domain with respective to PRB 0. The value is configured so that the corresponding RACH resource is entirely within the bandwidth of the UL BWP.

RACH-ConfigGeneric information element

```
-- ASN1START
-- TAG-RACH-CONFIG-GENERIC-START
RACH-ConfigGeneric ::=        SEQUENCE {
    prach-ConfigurationIndex      INTEGER (0..255),
    msg1-FDM                      ENUMERATED {one, two, four, eight},
    msg1-FrequencyStart            INTEGER (0..maxNrofPhysicalResourceBlocks−1),
    zeroCorrelationZoneConfig      INTEGER(0..15),
    preambleReceivedTargetPower    INTEGER (−202..−60),
    preambleTransMax              ENUMERATED {n3, n4, n5, n6, n7, n8, n10, n20, n50, n100, n200},
    powerRampingStep              ENUMERATED {dB0, dB2, dB4, dB6},
    ra-ResponseWindow             ENUMERATED {sl1, sl2, sl4, sl8, sl10, sl20, sl40, sl80},
    ...
}
-- TAG-RACH-CONFIG-GENERIC-STOP
-- ASN1STOP
```

FIG. 3 gives an example of the PRACH occasion configuration in NR.

In NR Rel-15, there are up to 64 sequences that can be used as random-access preambles per PRACH occasion in each cell. The RRC parameter totalNumberOfRA-Preambles determines how many of these 64 sequences are used as random-access preambles per PRACH occasion in each cell. The 64 sequences are configured by including firstly all the available cyclic shifts of a root Zadoff-Chu sequence, and secondly in the order of increasing root index, until 64 preambles have been generated for the PRACH occasion.

1.2.1. NR Rel-15 Association Between SSB and PRACH Occasion

NR Rel-15 supports one-to-one, one-to-many, and many-to-one association between SSB and PRACH occasions, as illustrated in FIGS. 4 and 5.

The preambles associated to each SSB are configured by the two RRC parameters in the RACH-ConfigCommon: ssb-perRACH-OccasionAndCB-PreamblesPerSSB and totalNumberOfRA-Preambles. The detailed mapping rule is specified in TS 38.213 section 8.1, as following:

For Type-1 random access procedure, a UE is provided a number N of SS/PBCH blocks associated with one PRACH occasion and a number R of contention based preambles per SS/PBCH block per valid PRACH occasion by ssb-perRACH-OccasionAndCB-Preambles-PerSSB.

A UE is provided a number N of SS/PBCH blocks associated with one PRACH occasion and a number R of contention-based preambles per SS/PBCH block per valid PRACH occasion by ssb-perRACH-OccasionAndCB-PreamblesPerSSB. If N<1, one SS/PBCH block is mapped to 1/N consecutive valid PRACH occasions and R contention based preambles with consecutive indexes associated with the SS/PBCH block per valid PRACH occasion start from preamble index 0. If N≥1, R contention based preambles with consecutive indexes associated with SS/PBCH block n, 0≤n≤N−1, per valid PRACH occasion start from preamble index $$n \cdot N^{total}_{preamble} / N \text{ where } N^{total}_{preamble}$$

is provided by totalNumberOfRA-Preambles and is an integer multiple of N.

SS/PBCH block indexes provided by ssb-PositionsIn-Burst in SIB1 or in ServingCellConfigCommon are mapped to valid PRACH occasions in the following order where the parameters are described in [4, TS 38.211].

First, in increasing order of preamble indexes within a single PRACH occasion

Second, in increasing order of frequency resource indexes for frequency multiplexed PRACH occasions Third, in increasing order of time resource indexes for time multiplexed PRACH occasions within a PRACH slot Fourth, in increasing order of indexes for PRACH slots FIG. 6 shows an example of the mapping between SSBs and preambles in different PRACH occasions.

For each SSB, the associated preambles per PRACH occasion, $$N^{total}_{preamble} / N,$$

are further divided into two sets for Contention Based Random Access (CBRA) and Contention Free Random Access (CFRA). The number of CB preambles per SSB per PRACH occasion, R, is signaled by the RRC parameter ssb-perRACH-OccasionAndCB-PreamblesPerSSB. Preamble indices for CBRA and CFRA are mapped consecutively for one SSB in one PRACH occasion, as shown in FIG. 7.

If Random Access Preambles group B is configured for CBRA, then, amongst the CBRA preambles (#CB-preambles-per-SSB) associated with an SSB, the first numberOfRA-PreamblesGroupA Random Access Preambles belong to Random Access Preambles group A, and the remaining Random Access Preambles associated with the SSB belong to Random Access Preambles group B. FIG. 8 shows an example, when Random Access Preambles group B is configured for CBRA. The RACH-ConfigCommon information element is shown below.

```
-- ASN1START
-- TAG-RACH-CONFIGCOMMON-START
RACH-ConfigCommon ::=                               SEQUENCE {
    Rach-ConfigGeneric                              RACH-ConfigGeneric,
    totalNumberOfRA-Preambles                       INTEGER (1 .. 63)   OPTIONAL, --Need S
    ssb-perRACH-OccasionANDCB-PreamblesPerSSB       CHOICE {
        oneEighth                                       ENUMERATED {n4, n8, n12, n16,
                                                            n20, n24, n28, n32, n36, n40,
                                                            n44, n48, n52, n56, n60, n64},
        oneFourth                                       ENUMERATED {n4, n8, n12, n16,
                                                            n20, n24, n28, n32, n36, n40,
                                                            n44, n48, n52, n56, n60, n64},
        oneHalf                                         ENUMERATED {n4, n8, n12, n16,
                                                            n20, n24, n28, n32, n36, n40,
                                                            n44, n48, n52, n56, n60, n64},
        one                                             ENUMERATED {n4, n8, n12, n16,
                                                            n20, n24, n28, n32, n36, n40,
                                                            n44, n48, n52, n56, n60, n64},
        two                                             ENUMERATED {n4, n8, n12, n16,
                                                            n20, n24, n28, n32},
        four                                            INTEGER (1 .. 16),
```

-continued

| | |
|---|---|
| eight | INTEGER (1 . . 8), |
| sixteen | INTEGER (1 . . 4), |
| } | OPTIONAL,   -- Need M |
| groupBconfigured | SEQUENCE { |
| ra-Msg3SizeGroupA | ENUMERATED {b56, b144, b208, b256, b282, b480, b640, b800, b1000, b72, spare6, spare5, spare4, spare3, spare2, spare1}, |
| messagePowerOffsetGroupB | ENUMERATED { minusinfinity, dB0, dB5, dB8, dB10, dB12, DB15, dB18}, |
| numberOfRA-PreamblesGroupA | INTEGER (1 . . 64) |
| } | |

According to TS 38.213, one of the two conditions must be met in order for a UE to select Random Access Preambles group B for PRACH transmission:

Condition 1: potential Msg3 size (UL data available for transmission plus MAC header and, where required, MAC CEs) is greater than ra-Msg3SizeGroupA and the pathloss is less than PCMAX (of the Serving Cell performing the Random Access Procedure)–preambleReceivedTarget-Power–msg3-DeltaPreamble–messagePowerOffsetGroupB; or Condition 2: the Random Access procedure was initiated for the CCCH logical channel and the CCCH SDU size plus MAC subheader is greater than ra-Msg3SizeGroupA.

1.3. RRC Establishment Cause for UE Differentiation

In step 3 of the 4-step random access procedure shown in FIG. 1, a UE includes the rrcSetupRequest message in Msg3. The rrcSetupRequest message contains the parameter, establishmentCause, which indicates the establishment cause that triggers the connection establishment (e.g., emergency call, mission critical services, multimedia priority services, etc.).

A network node 104 (e.g., a gNB) identifies the type of connection request from the UE by decoding the establishment cause received in msg3. Based on the received establishment clause, the network node 104 decides whether this request shall be admitted or rejected, based on the network traffic load situation and available resource in the network.

1.4. NR Rel-16 for MsgA Configuration

1.4.1. MsgA Preamble Configuration

The RACH occasions for 2-step RACH shown in FIG. 2 can be either separately configured (also known as Type-2 random access procedure with separate configuration of PRACH occasions with Type-1 random access procedure) or are shared with 4-step RACH (also known as Type-2 random access procedure with common configuration of PRACH occasions with Type-1 random access procedure) in which case different set of preamble IDs will be used.

For Type-2 random access procedure with common configuration of PRACH occasions with Type-1 random access procedure, a UE is provided a number N of SS/PBCH blocks associated with one PRACH occasion by ssb-perRACH-OccasionAndCB-PreamblesPerSSB and a number Q of contention based preambles per SS/PBCH block per valid PRACH occasion by msgA-CB-PreamblesPerSSB. The PRACH transmission can be on a subset of PRACH occasions associated with a same SS/PBCH block index for a UE provided with a PRACH mask index by msgA-ssb-share-dRO-MaskIndex. An example of the SSB to RO mapping and the preamble allocation (in which only one preamble group is assumed) is provided in FIG. 9.

For Type-2 random access procedure with separate configuration of PRACH occasions with Type-1 random access procedure, a UE is provided a number N of SS/PBCH blocks associated with one PRACH occasion and a number R of contention based preambles per SS/PBCH block per valid PRACH occasion by ssb-perRACH-OccasionAndCB-PreamblesPerSSB-msgA when provided; otherwise, by ssb-perRACH-OccasionAndCB-PreamblesPerSSB. Because the SSB to RO mapping and the preamble allocation are independently configured, the example provided for 4-step RACH in FIG. 9 is also valid for this case of 2-step RACH except that the parameters are separately configured for 2-step RACH.

1.4.2. MsgA PUSCH Configuration

A PUSCH occasion is defined as the time frequency resource used for one PUSCH transmission. For one msgA PUSCH occasion, one or more DMRS resources can be configured, one of which will be selected for each PUSCH transmission with in the PUSCH occasion.

A set of PUSCH occasions are configured per MsgA PUSCH configuration which are relative to and mapped by a group of preambles in a set of ROs in one PRACH slot. A mapping between one or multiple PRACH preambles and a PUSCH occasion associated with a DMRS resource is according to the mapping order as described below.

Each consecutive number of $N_{preamble}$ preamble indexes from valid PRACH occasions in a PRACH slot first, in increasing order of preamble indexes within a single PRACH occasion second, in increasing order of frequency resource indexes for frequency multiplexed PRACH occasions third, in increasing order of time resource indexes for time multiplexed PRACH occasions within a PRACH slot are mapped to a valid PUSCH occasion and the associated DMRS resource first, in increasing order of frequency resource indexes $f_{id}$ for frequency multiplexed PUSCH occasions second, in increasing order of DMRS resource indexes within a PUSCH occasion, where a DMRS resource index $DMRS_{id}$ is determined first in an ascending order of a DMRS port index and second in an ascending order of a DMRS sequence index [4, TS 38.211]

third, in increasing order of time resource indexes $t_{id}$ for time multiplexed PUSCH occasions within a PUSCH slot fourth, in increasing order of indexes for $N_s$ PUSCH slots where $N_{preamble}=ceil(T_{preamble}/T_{PUSCH})$, $T_{preamble}$ is a total number of valid PRACH occasions per association pattern period multiplied by the number of preambles per valid PRACH occasion provided by msgA-PUSCH-Preamble-Group, and $T_{PUSCH}$ is a total number of valid PUSCH occasions per PUSCH configuration per association pattern period multiplied by the number of DMRS resource indexes per valid PUSCH occasion provided by msgA-DMRS-Config.

1.5. 5G Use Cases and Services

1.5.1. Mission Critical Communications

First responders, such as fire-fighters, policemen and emergency medical service personnel, require fast, reliable and secure communications in various mission critical (MC) situations. During major emergency incidents, such as nature disasters, there can be a high demand of MC traffic for supporting first responders' rescue operation on site. At the same time, mobile data traffic generated by public users can increase significantly, e.g., for making emergency calls, sharing information to friends or relatives. If first responders and general public users share the same network, it is crucial to ensure the flow of critical information (e.g., MC services and emergency calls) no matter how busy the network is. This brings stringent requirements for 5G access control mechanisms to be able to early identify and prioritize access requests from mission critical users, to guarantee that they are accepted and properly served even when the network experiences congestion.

1.5.2. Small Data Transmission

NR supports the RRC_INACTIVE state, and UEs with infrequent (periodic and/or non-periodic) data transmission are generally maintained by the network in the RRC_INACTIVE state. Until NR Rel-16, the RRC_INACTIVE state did not support data transmission. Hence, the UE had to resume the connection (e.g., move to the RRC_CONNECTED state) for any DL (e.g., mobile termination (MT)) and UL (e.g., mobile originating (MO)) data. Connection setup and subsequently release to INACTIVE state happens for each data transmission however small and infrequent the data packets are. This results in unnecessary power consumption and signaling overhead.

A work item for support of small data transmission (SDT) in NR release 17 is approved in RAN #86.

In RAN2 #111-e meeting, where it has been agreed that both 2-step RACH and 4-step RACH will be applied to RACH based uplink small data transmission via Msg3 PUSCH or MsgA PUSCH. To support SDT on Msg3 PUSCH or MsgA PUSCH, the network node needs to be able to identify/differentiate an access request related to SDT over other access requests.

1.5.3. Satellite Communications

Satellite access networks have been playing a complementary role in the communications ecosystem. Despite the wide deployment of terrestrial mobile networks, there are unserved or underserved areas around the globe due to economic rationales. For example, providing coverage in rural or remote areas has been challenging in many countries because the investment cost may not justify the expected revenue. In contrast, a single communication satellite can cover a large geographic area, and, thus, it might be economically appealing to use satellite communications to augment terrestrial networks to provide connectivity in rural and remote areas. In urban areas, high-throughput satellites communications systems may help offload traffic in terrestrial networks. Another potential alternative is to use satellites for backhauling, fostering the rollout of 5G services with potentially reduced costs in rural and remote areas.

The large satellite coverage can also benefit communication scenarios with airborne and maritime platforms (onboard aircrafts or vessels), while being attractive in certain machine-to-machine and telemetry applications. Additionally, satellites are resilient to natural disasters on earth, making satellite communications key for emergency services in case that the terrestrial network infrastructures are degraded. Therefore, if multiple services (e.g., small data transmission (SDT), MC Services, TV broadcast, or SDT services) are supported by satellite communications, it is beneficial for a satellite base station to be able to differentiate different services or UE types at an early stage so that it can optimize its own the admission control and scheduling decisions, or/and better coordinate with the terrestrial network nodes to secure the flow of critical information.

1.5.4. 5G Network Slicing

Network slicing is a concept introduced in 5G to enable service differentiation on a common network infrastructure. Each slice can be a collection of network functionalities or/and resources that are optimized to meet the specific requirement for a service type. For instance, a network can configure different slices for enhanced Mobile Broadband (eMBB) service, vehicle-to-everything (V2X) service, MC service, etc. The current NR standard supports only resource separation of user plane data, not the full separation of control plane resources, meaning that all network slices share the same RACH configuration for UEs in the RRC Idle/Inactive states.

SUMMARY

Based on the existing NR Rel-15 and Rel-16 4-step RACH procedure, during an initial access phase, the earliest time for a network node to identify a UE type or a service type is in step 3 of the RACH procedure (e.g., after a successful reception of the RRC establishment caused in msg3 transmitted from the UE). In the existing procedures, regardless of subscription type, service type, and/or configured network slice, all UEs in RRC Idle or Inactive states are configured with the same 4-step RACH configuration (e.g., the same PRACH occasions and the same PRACH configuration index, etc.) for transmitting msg1 when performing random access. Therefore, in existing procedures, it is not possible for a network node to differentiate or identify any of the UE type, the service type, and the slice ID by detecting msg1, and a network node cannot prioritize Msg1/Msg2/Msg3 transmissions for certain high priority services or some slices in random access.

In addition, according to the current NR standard (NR Rel-15 and Rel-16), the establishmentCause for all mission critical (MC) UEs will be set to mcs-PriorityAccess, regardless of the priority/role of this MC UE. This implies that a network node cannot further differentiate between different MC UEs/Services in an initial access procedure.

For a 2-step RA procedure, the reliability of msgA preamble part and PUSCH part might be quite different due to the PUSCH colliding in 2-step RACH while msg3 PUSCH in 4-step RACH is dynamically scheduled by RAR (for initial transmission) or DCI (for retransmission). In some other aspects, the msgA PUSCH resource used for higher priority may be prioritized so that the msgA PUSCH performance can be assured (e.g., if msgA preamble part cannot be used for UE priority identification).

Aspects of the invention may overcome one or more of these problems by pre-configuring UEs to different groups depending on the UE priority/type, the UE's service priority/ type, and/or the UE's configured network slices. A Network node may configure different PRACH configurations (within 2-step RACH or 4-step RACH) and/or msgA PUSCH configurations (within 2-step RACH only) for different groups. A UE may select which configuration to use for random-access preamble transmission based on its associated group.

Aspects of the invention may enable a network node to differentiate different UE subscription types, UE service types, and/or network slice identities during a random access procedure.

Aspects of the invention may additionally or alternatively enable a network node to identify a UE subscription type (e.g., a MC UE), a service type (e.g., MC Video, SDT, Satellite communications), and/or a network slice at the first step of a 4-step RACH procedure. Thus, the network node may be able to adapt the subsequent steps of the RACH procedure to prioritize the high priority UEs/services/slices at an earlier stage. The network node may additionally or alternatively be able to optimize the scheduling decisions for the following message transmissions during random access according to the corresponding requirements.

Aspects of the invention may additionally or alternatively be used for supporting a finer differentiation between different MC UEs/UE-groups and/or between different MC Services in a RACH procedure. Therefore, a network node may be able to perform a finer admission control for different MC UEs/Services at an early stage.

One aspect of the invention may provide a method performed by a user equipment. The method may include selecting a physical random access channel (PRACH) configuration from a group including at least a first PRACH configuration associated with a first group and a second PRACH configuration associated with a second group. The first and second PRACH configurations may be different. The method may include transmitting a random access preamble in accordance with the selected PRACH configuration.

In some aspects, the method may further include transmitting a request message in physical uplink shared channel (PUSCH) with the random access preamble. In some aspects, the method may further include receiving a random access response (RAR) to the transmitted random access preamble. In some aspects, the RAR may include a UE identifier assignment, timing advance information, and a contention resolution message. In some aspects, the method may further include, in response to receiving and successfully decoding the RAR, transmitting a request message in PUSCH.

In some aspects, the method may further include: receiving the first PRACH configuration, and receiving the second PRACH configuration. In some aspects, the first and second PRACH configurations may be received as part of a system information block.

In some aspects, the group may further include a third PRACH configuration associated with a third group; the first, second, and third PRACH configurations may be different. In some aspects, the method may further include receiving a system information block including the first, second, and third PRACH configurations.

In some aspects, the first and second PRACH configurations may be different in at least one of the following parameters: valid PRACH occasions, PRACH configuration periodicities, preamble formats, and configured preamble indexes per random access occasion.

In some aspects, PRACH occasions of the first PRACH configuration may be separated from PRACH occasions of the second PRACH configuration in the time domain. In some aspects, a PRACH configuration index parameter in a system information block may indicate the PRACH occasions of the second PRACH configuration.

In some aspects, PRACH occasions of the first PRACH configuration may be separated from PRACH occasions of the second PRACH configuration in the frequency domain. In some aspects, a frequency start parameter may indicate the start position in frequency for the PRACH occasions of the second PRACH configuration. In some aspects, a frequency division multiplexing parameter may indicate the number of PRACH occasions of the second PRACH configuration frequency division multiplexed at one time instance. In some aspects, PRACH occasions of the first PRACH configuration and PRACH occasions of the second PRACH configuration may be consecutive in the frequency domain at one time instance.

In some aspects, the first PRACH configuration may have a first periodicity, the second PRACH configuration may have a second periodicity, and the first and second periodicities may be different. In some aspects, the second periodicity may be shorter than the first periodicity.

In some aspects, the first PRACH configuration may have a first preamble format, the second PRACH configuration may have a second preamble format, and the first and second preamble formats may be different. In some aspects, the second preamble format may have longer sequence length than the first preamble format.

In some aspects, the first PRACH configuration may have a first set of preamble indexes per PRACH occasion, the second PRACH configuration may have a second set of preamble indexes per PRACH occasion, and the first and second sets of preamble indexes may not overlap. In some aspects, the first set of preamble indexes may be preamble indexes in preamble group A for contention based random access, and the second set of preamble indexes are preamble indexes in preamble group B for contention based random access. In some aspects, a first parameter may indicate a total number of preamble indexes in the first set, and a second parameter may indicate a total number of preamble indexes in the second set. In some aspects, a value of the second parameter may be evenly dividable by a number of synchronization signals/physical broadcast channel blocks (SSBs). In some aspects, a value of the first parameter plus a value of the second parameter may be less than or equal to 64.

In some aspects, the first PRACH configuration may include a first set of preambles, the second PRACH configuration may include a second set of preambles, and the first and second sets may be mutually exclusive. In some aspects, the preambles of the second set may be generated using different root values and/or cyclic shift values than those used to generate the preambles of the first set.

In some aspects, a random access preamble in accordance with the second PRACH configuration may be transmitted at a higher power than a random access preamble transmitted in accordance with the first PRACH configuration. In some aspects, a parameter in the first and second PRACH configurations may indicate the power at which the random access preamble is transmitted.

In some aspects, the method may further include re-transmitting the random access preamble in accordance with the second PRACH configuration with a higher power than the previous transmission of the random access preamble.

In some aspects, the selection is based on a priority of the UE, a type of the UE, a priority of a service, a type of the service, and/or a network slice, and the method may further include transmitting with the random access preamble an explicit indication of the priority of the UE, the type of the UE, the priority of the service, the type of the service, and/or a network slice identification (ID) of the network slice on which the selection is based. In some aspects, the explicit indication may include a UE access identification, an alarm type, a service type, and/or UE position information.

In some aspects, transmitting the random access preamble in accordance with the second PRACH configuration may include transmitting a physical uplink shared channel (PUSCH) using a PUSCH resource reserved for a set of one or more UE types, one or more UE priorities, one or more service types, one or more service priorities, and/or one or more network slices. In some aspects, the reserved PUSCH resource may include: (i) a demodulation reference signal (DMRS) resource for msgA PUSCH including a DMRS port and/or a DMRS sequence, (ii) a time and/or frequency resource for msgA PUSCH, (iii) power control related parameters for msgA PUSCH including a power ramping step size, a power ramping counter, a power offset relative to the preamble received target power, a power scaling factor for scaling an estimated path loss, and/or a transmit power command (TPC), (iv) a listen before talk (LBT) type of msgA PUSCH, (v) a cyclic prefix (CP) extension of msgA PUSCH, (vi) a frequency hopping configuration of msgA PUSCH, (vii) a waveform of msgA PUSCH, (viii) an interlace configuration of msgA PUSCH, and/or (ix) a modulation coding scheme (MCS) configuration of msgA PUSCH.

In some aspects, the selection may be based on a priority of the UE, a type of the UE, a priority of a service, a type of the service, and/or a network slice of the UE.

In some aspects, the selection may based on a priority of the UE. In some aspects, the first group may be associated with a first priority, the second group may be associated with a second priority, the second priority may be higher than the first priority, the first PRACH may be selected if the UE has the first priority, and the second PRACH may be selected if the UE has the second priority.

In some aspects, the selection may be based on a type of the UE. In some aspects, the second group may be associated with a set of one or more UE types, and the second PRACH may be selected if the type of the UE is within the set of one or more UE types. In some aspects, the type of the UE may be a subscription type. In some aspects, the set of one or more UE types may include a mission critical (MC) UE and/or a multimedia priority UE.

In some aspects, the method may be for establishing a connection with a network node to obtain a service. In some aspects, the service may be an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, and/or an air-to-ground communication (A2G) service.

In some aspects, the selection may be based on a priority of the service. In some aspects, the first group may be associated with a first priority, the second group may be associated with a second priority, the second priority may be higher than the first priority, the first PRACH may be selected if the service has the first priority, and the second PRACH may be selected if the service has the second priority.

In some aspects, the selection may be based on a type of the service. In some aspects, the type of the service may be one of an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, or an air-to-ground communication (A2G) service. In some aspects, the set of one or more service types may include a mission critical (MC) service.

In some aspects, the second group may be associated with a set of one or more service types, and the second PRACH may be selected if the type of the service is within the set of one or more service types. In some aspects, the set of one or more service types may include an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, and/or an air-to-ground communication (A2G) service. In some aspects, the set of one or more service types may include an MC service.

In some aspects, the selection may be based on a network slice identification (ID). In some aspects, the second group may be associated with a set of one or more network slice IDs, and the second PRACH may be selected if the network slice ID is within the set of one or more network slice IDs.

Another aspect of the invention may provide a user equipment (UE). The UE may be adapted to select a PRACH configuration from a group including at least a first PRACH configuration associated with a first group and a second PRACH configuration associated with a second group. The first and second PRACH configurations may be different. The UE may be adapted to transmit a random access preamble in accordance with the selected PRACH configuration.

Still another aspect of the invention may provide a method performed by a network node. The method may include receiving a random access preamble transmitted by a user equipment (UE). The method may include determining a physical random access channel (PRACH) configuration that was used by the UE to transmit the random access preamble. The method may include determining that the UE has a first priority, the UE has a first UE type, a service has the first priority, the service has a first service type, and/or a first network slice if the PRACH configuration of the received random access preamble is determined to be a first PRACH configuration. The method may include determining that the UE has a second priority, the UE has a second UE type, the service has the second priority, the service has a second service type, and/or a second network slice if the PRACH configuration of the received random access preamble is determined to be a second PRACH configuration. The first and second PRACH configurations may be different.

In some aspects, the method may further include receiving a request message in physical uplink shared channel (PUSCH) with the random access preamble. In some aspects, the method may further include, in response to receiving the random access preamble, transmitting a random access response (RAR). In some aspects, the transmitted RAR may include a UE identifier assignment, timing advance information, and a contention resolution message. In some aspects, the method may further include receiving a request message in physical uplink shared channel (PUSCH) that was conveyed by the UE. In some aspects, the method may further include: transmitting the first PRACH configuration and transmitting the second PRACH configuration. In some aspects, the first and second PRACH configurations may be transmitted as part of a system information block.

In some aspects, the method may further include determining that the UE has a third priority, the UE has a third UE type, the service has the third priority, the service has a third service type, and/or a third network slice if the PRACH configuration of the received random access preamble is determined to be a third PRACH configuration. The first, second, and third random access preamble configurations may be different. In some aspects, the method may further include transmitting a system information block including the first, second, and third PRACH configurations.

In some aspects, the first and second PRACH configurations may be different in at least one of the following parameters: valid PRACH occasions, PRACH configuration periodicities, preamble formats, and configured preamble indexes per random access occasion.

In some aspects, PRACH occasions of the first PRACH configuration may be separated from PRACH occasions of the second PRACH configuration in the time domain, and determining the PRACH configuration of the received random access preamble may include determining a time domain of a PRACH occasion in which the received random access preamble was transmitted. In some aspects, a PRACH configuration index parameter in a system information block may indicate the PRACH occasions of the second PRACH configuration.

In some aspects, PRACH occasions of the first PRACH configuration may be separated from PRACH occasions of the second PRACH configuration in the frequency domain, and determining the PRACH configuration of the received random access preamble may include determining a frequency domain of a PRACH occasion in which the received random access preamble was transmitted. In some aspects, a frequency start parameter may indicate the start position in frequency for the PRACH occasions of the second PRACH configuration. In some aspects, a frequency division multiplexing parameter may indicate the number of PRACH occasions of the second PRACH configuration frequency division multiplexed at one time instance. In some aspects, PRACH occasions of the first PRACH configuration and PRACH occasions of the second PRACH configuration may be consecutive in the frequency domain at one time instance.

In some aspects, the first PRACH configuration may have a first periodicity, the second PRACH configuration may have a second periodicity, and the first and second periodicities may be different. In some aspects, the second periodicity may be shorter than the first periodicity.

In some aspects, the first PRACH configuration may have a first preamble format, the second PRACH configuration may have a second preamble format, and the first and second preamble formats may be different. In some aspects, the second preamble format may have longer sequence length than the first preamble format.

In some aspects, the first PRACH configuration may have a first set of preamble indexes per PRACH occasion, the second PRACH configuration may have a second set of preamble indexes per PRACH occasion, the first and second sets of preamble indexes may not overlap, and determining the PRACH configuration of the received random access preamble may include determining whether a preamble index of the received random access preamble is in the first set or the second set. In some aspects, the first set of preamble indexes may be preamble indexes in preamble group A for contention based random access, and the second set of preamble indexes may be preamble indexes in preamble group B for contention based random access. In some aspects, a first parameter may indicate a total number of preamble indexes in the first set, and a second parameter may indicate a total number of preamble indexes in the second set. In some aspects, a value of the second parameter may be evenly dividable by a number of synchronization signals/physical broadcast channel blocks (SSBs). In some aspects, a value of the first parameter plus a value of the second parameter may be less than or equal to 64.

In some aspects, the first PRACH configuration may include a first set of preambles, the second PRACH configuration may include a second set of preambles, the first and second sets may be mutually exclusive, and determining the PRACH configuration of the received random access preamble may include determining whether the received random access preamble is in the first set or the second set. In some aspects, the preambles of the second set may be generated using different root values and/or cyclic shift values than those used to generate the preambles of the first set.

In some aspects, a random access preamble transmitted in accordance with the second PRACH configuration may be transmitted at a higher power than a random access preamble transmitted in accordance with the first PRACH configuration. In some aspects, a parameter in the first and second PRACH configurations may indicate the power at which the random access preamble transmitted.

In some aspects, the method may further include receiving an explicit indication of a priority of the UE, a type of the UE, a priority of the service, a type of the service, and/or a network slice identification (ID). The explicit indication may have been transmitted by the UE and received with the random access preamble, and the PRACH configuration of the received random access preamble may be determined using the explicit indication. In some aspects, the explicit indication may include a UE access identification, an alarm type, a service type, and/or UE position information.

In some aspects, the random access preamble may be determined to have the second PRACH configuration if an associated physical uplink shared channel (PUSCH) was transmitted using a PUSCH resource reserved for a set of one or more UE types, one or more UE priorities, one or more service types, one or more service priorities, and/or one or more network slices. In some aspects, the reserved PUSCH resource may include: (i) a demodulation reference signal (DMRS) resource for msgA PUSCH including a DMRS port and/or a DMRS sequence, (ii) a time and/or frequency resource for msgA PUSCH, (iii) power control related parameters for msgA PUSCH including a power ramping step size, a power ramping counter, a power offset relative to the preamble received target power, a power scaling factor for scaling an estimated path loss, and/or a transmit power command (TPC), (iv) a listen before talk (LBT) type of msgA PUSCH, (v) a cyclic prefix (CP) extension of msgA PUSCH, (vi) a frequency hopping configuration of msgA PUSCH, (vii) a waveform of msgA PUSCH, (viii) an interlace configuration of msgA PUSCH, and/or (ix) a modulation coding scheme (MCS) configuration of msgA PUSCH.

In some aspects, the UE may be attempting to establish a connection with the network node to obtain the service. In some aspects, the UE may be determined to have the first priority if the PRACH configuration of the received random access preamble is determined to be a first PRACH configuration, the UE may be determined to have the second priority if the PRACH configuration of the received random access preamble is determined to be a second PRACH configuration, and the second priority may be higher than the first priority.

In some aspects, the UE may be determined to have the first UE type if the PRACH configuration of the received random access preamble is determined to be a first PRACH configuration, the UE may be determined to have the second UE type if the PRACH configuration of the received random access preamble is determined to be a second PRACH configuration, and the first and second UE types may be different. In some aspects, the first and second UE types may be subscription types. In some aspects, the second UE type may be a mission critical (MC) UE or a multimedia priority UE. In some aspects, the second UE type may be one of a set of one or more UE types. In some aspects, the set of one or more UE types may include a mission critical (MC) UE and/or a multimedia priority UE.

In some aspects, the service may be determined to have the first priority if the PRACH configuration of the received random access preamble is determined to be a first PRACH configuration, the service may be determined to have the second priority if the PRACH configuration of the received random access preamble is determined to be a second PRACH configuration, and the second priority may be higher than the first priority.

In some aspects, the service may be determined to have the first service type if the PRACH configuration of the received random access preamble is determined to be a first PRACH configuration, the service may be determined to have the second service type if the PRACH configuration of the received random access preamble is determined to be a second PRACH configuration, and the first and second service types may be different. In some aspects, the second service type may be a mission critical (MC) service. In some aspects, the second service type may be one of a set of one or more service types. In some aspects, the set of one or more service types may include a mission critical (MC) service.

In some aspects, the first network slice may be determined if the PRACH configuration of the received random access preamble is determined to be a first PRACH configuration, the second network slice may be determined if the PRACH configuration of the received random access preamble is determined to be a second PRACH configuration, and the first and second network slices may be different. In some aspects, the second network slice may be one of a set of one or more network slices.

In some aspects, the service may be an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, or an air-to-ground communication (A2G) service.

Yet another aspect of the invention may provide a network node. The network node may be adapted to receive a random access preamble transmitted by a user equipment (UE). The network node may be adapted to determine a PRACH configuration that was used by the UE to transmit the random access preamble. The network node may be adapted to determine that the UE has a first priority, the UE has a first UE type, a service has the first priority, the service has a first service type, and/or a first network slice if the PRACH configuration of the received random access preamble is determined to be a first PRACH configuration. The network node may be adapted to determine that the UE has a second priority, the UE has a second UE type, the service has the second priority, the service has a second service type, and/or a second network slice if the PRACH configuration of the received random access preamble is determined to be a second PRACH configuration. The first and second PRACH configurations may be different.

Yet another aspect of the invention may provide a computer program including instructions for adapting an apparatus to perform the method of any one of the aspects above. Still another aspect of the invention may provide a carrier containing the computer program, and the carrier may be one of an electronic signal, optical signal, radio signal, or compute readable storage medium.

Yet another aspect of the invention may provide an apparatus. The apparatus may include processing circuitry and a memory. The memory may contain instructions executable by said processing circuitry, whereby said apparatus is operative to perform the method of any one of the aspects above.

Still another aspect of the invention may provide an apparatus adapted to perform the method of any one of the aspects above.

Yet another aspect of the invention may provide any combination of the embodiments set forth above.

BRIEF DESCRIPTION OF THE DRAWINGS

The accompanying drawings, which are incorporated herein and form part of the specification, illustrate various embodiments.

DETAILED DESCRIPTION

2. Terminology

Figure 1:
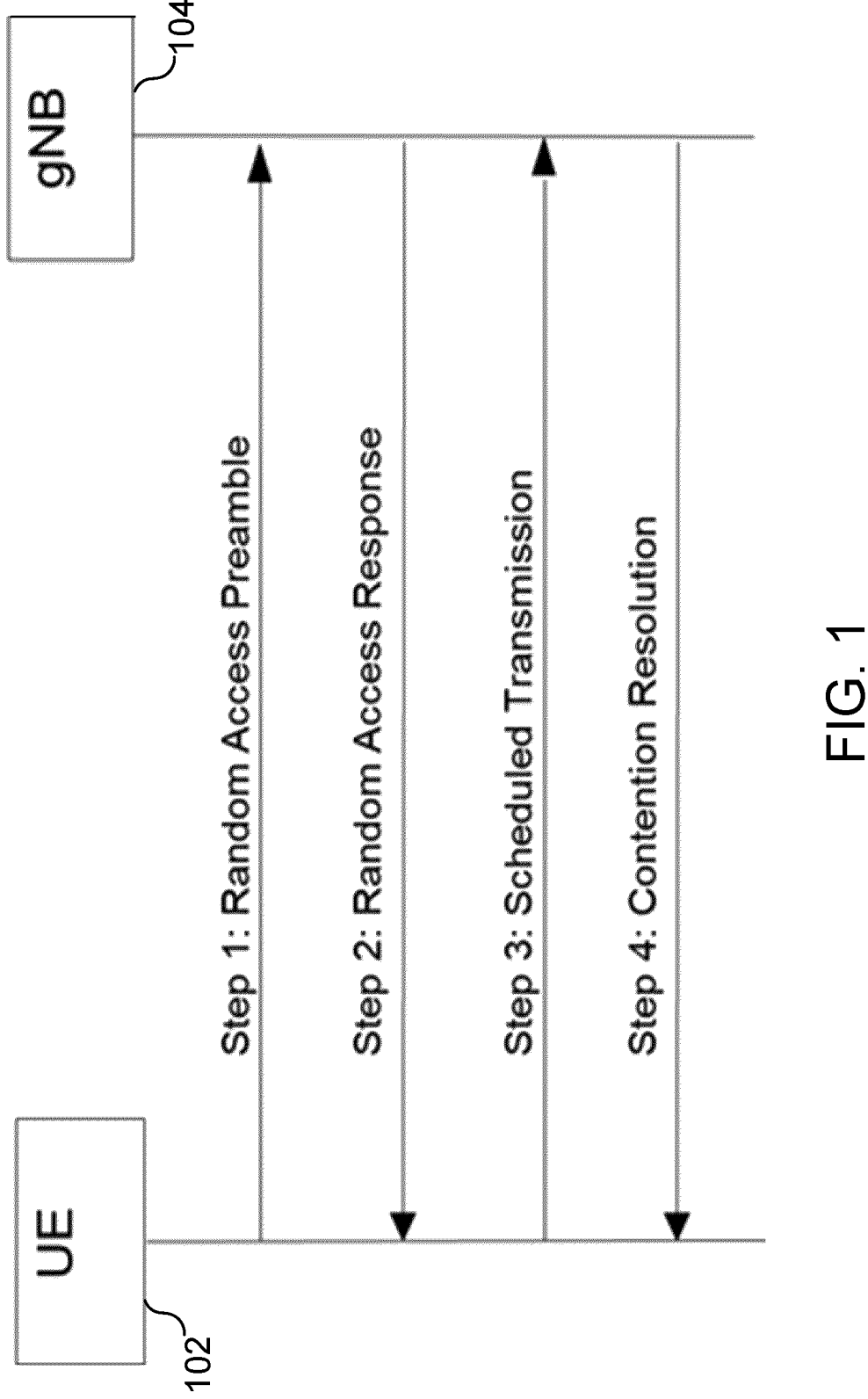
FIG. 1 illustrates a four-step random access procedure for initial access.
Figure 2:
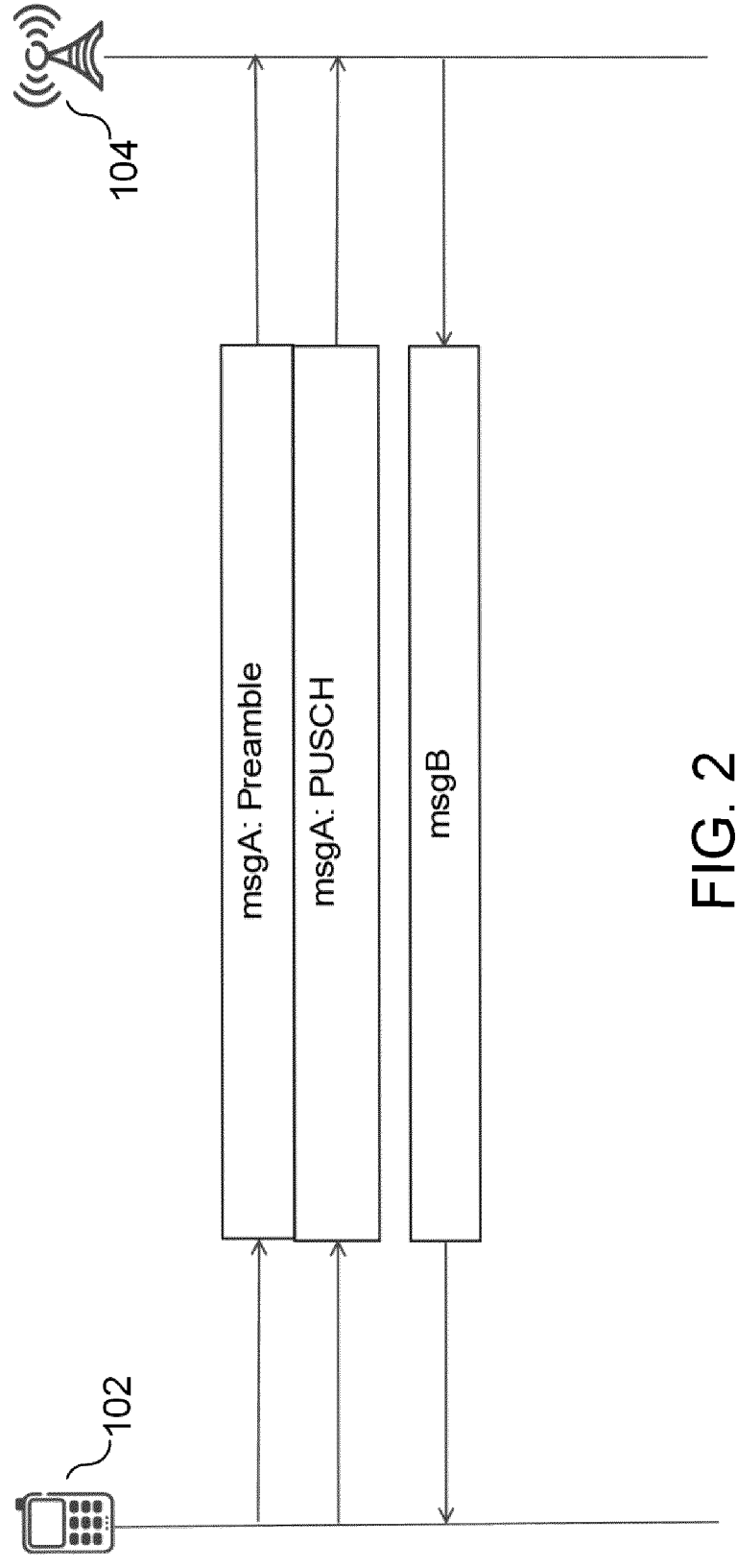
FIG. 2 illustrates a two-step random access procedure for initial access.
Figure 3:
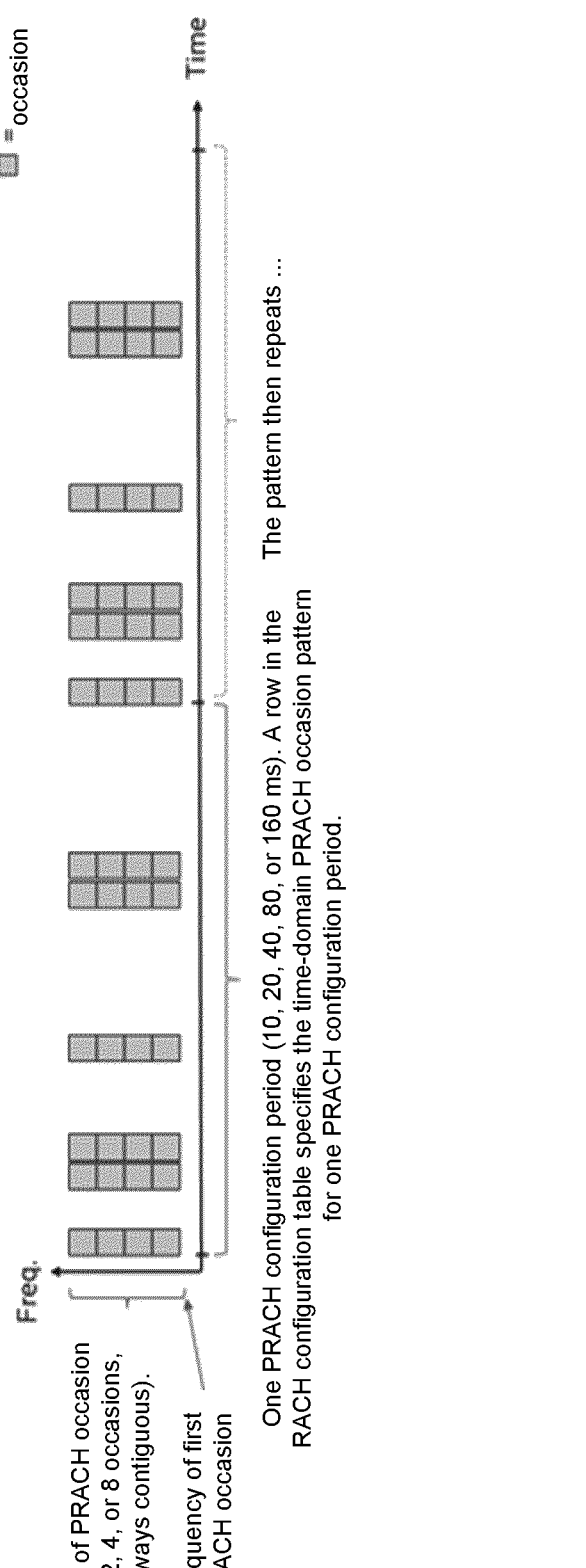
FIG. 3 illustrates a PRACH configuration in NR.
Figure 4:
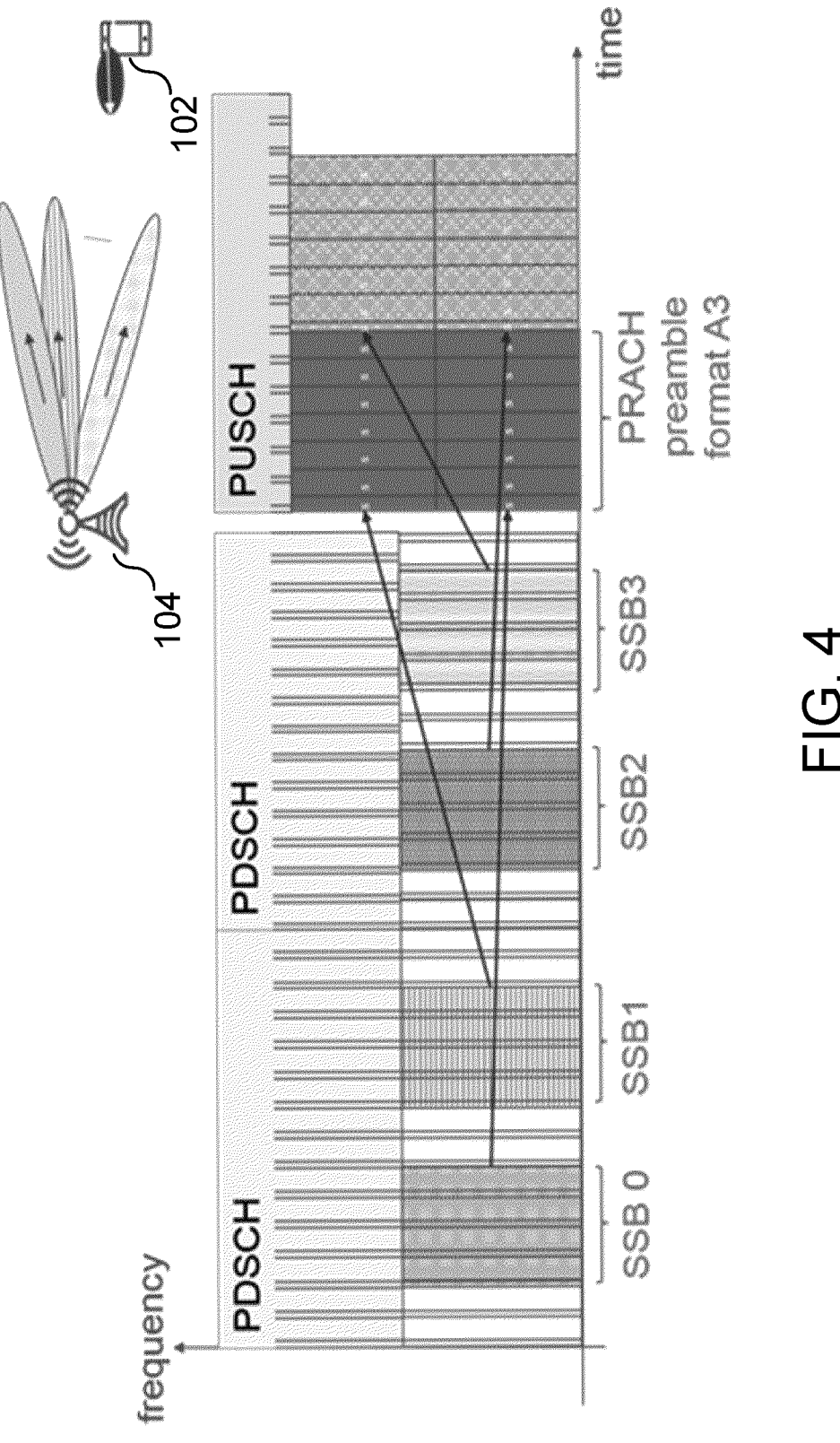
FIG. 4 illustrates an example of one SSB per PRACH occasion.
Figure 5:
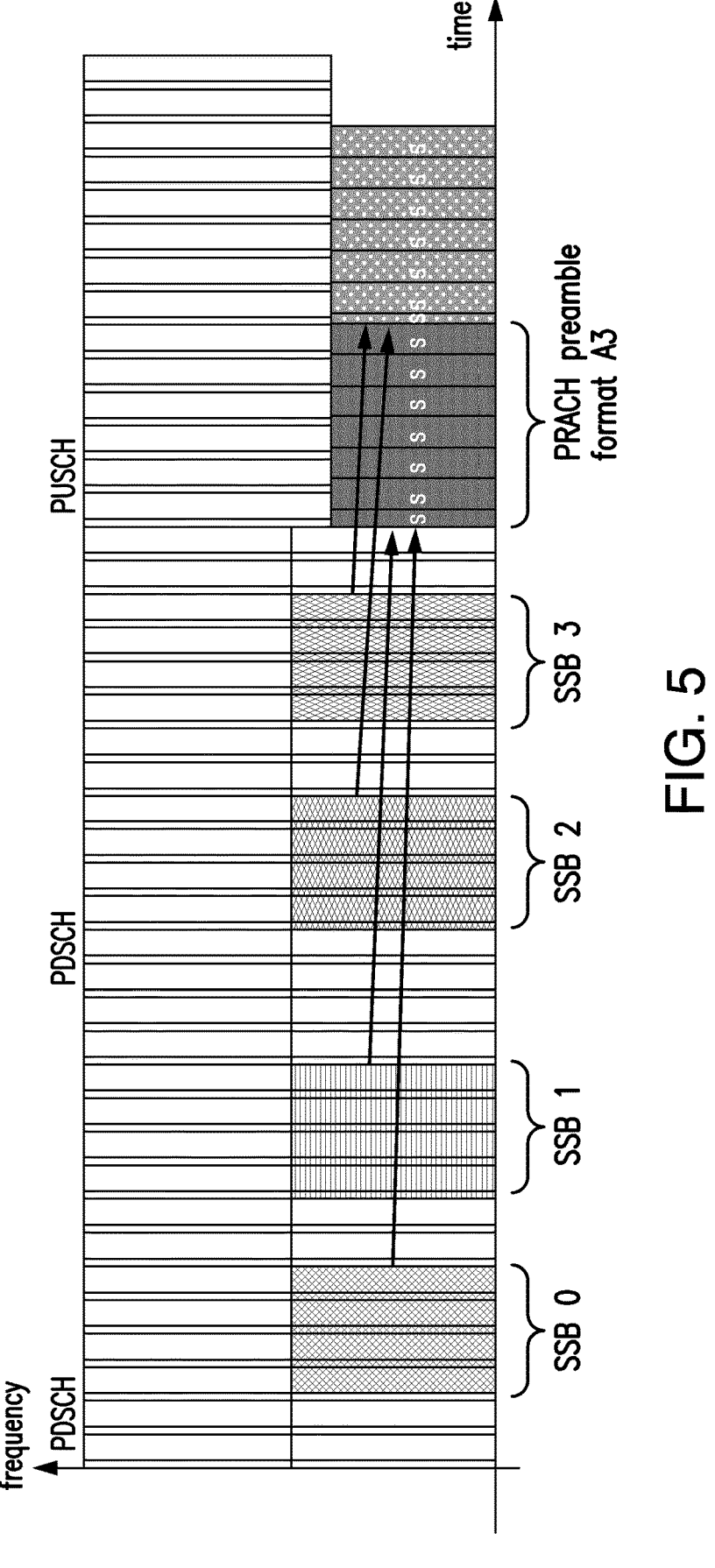
FIG. 5 illustrates an example with 2 SSBs per PRACH occasion.
Figure 6:
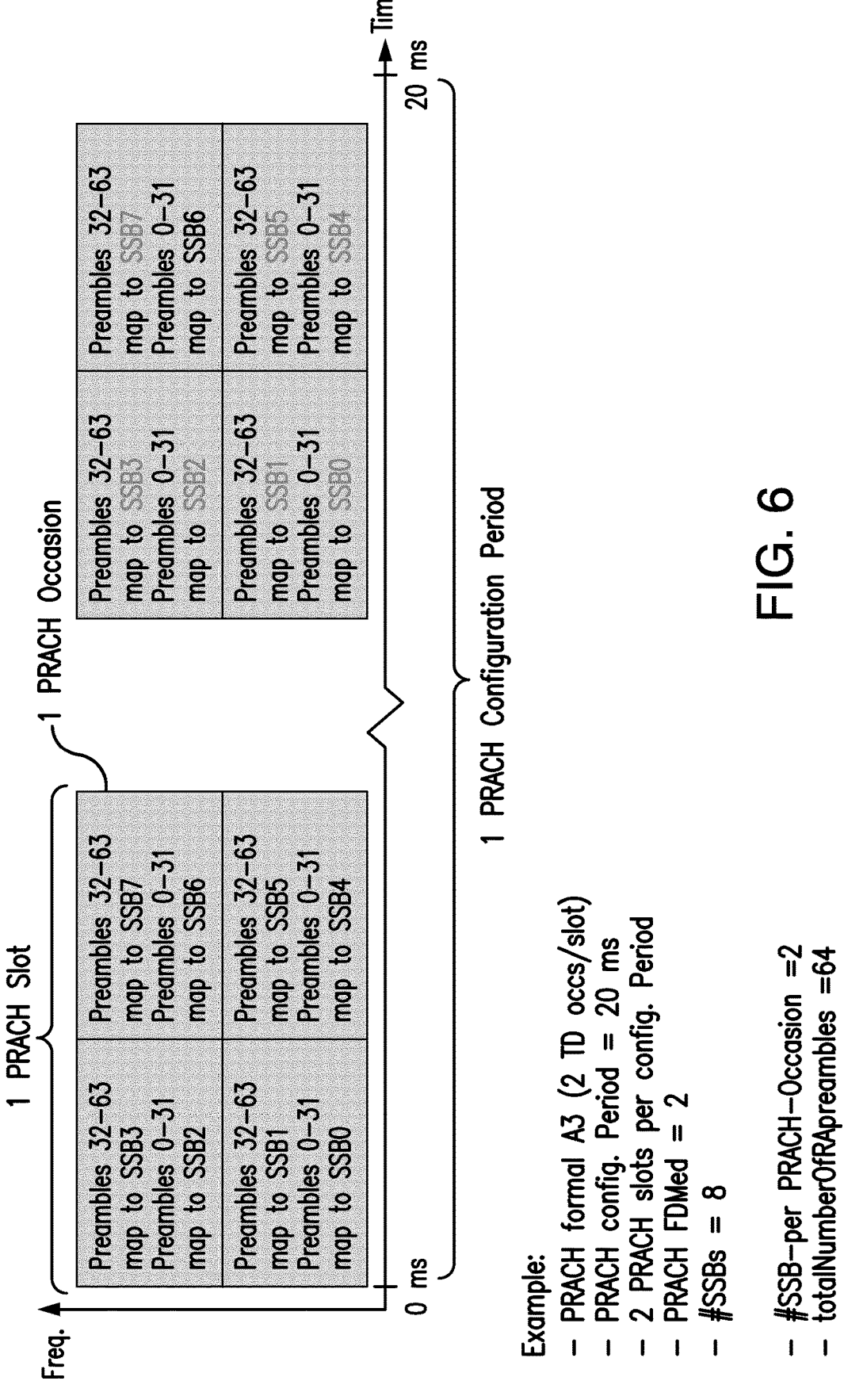
FIG. 6 illustrates the mapping between SSB and random-access preambles.
Figure 7:
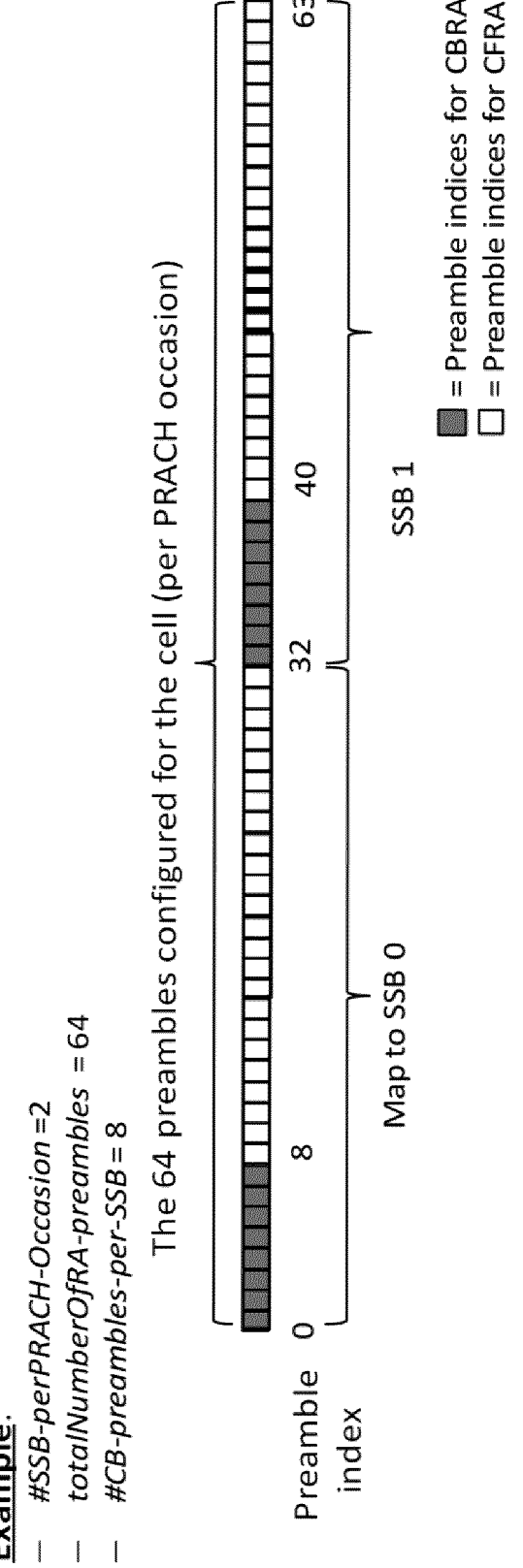
FIG. 7 illustrates the associated preambles for CBRA and CFRA per SSB per PRACH occasion.
Figure 8:
FIG. 8 illustrates the associated preambles for CBRA and CFRA per SSB per PRACH occasion, when Random Access Preambles group B is configured.
Figure 9:
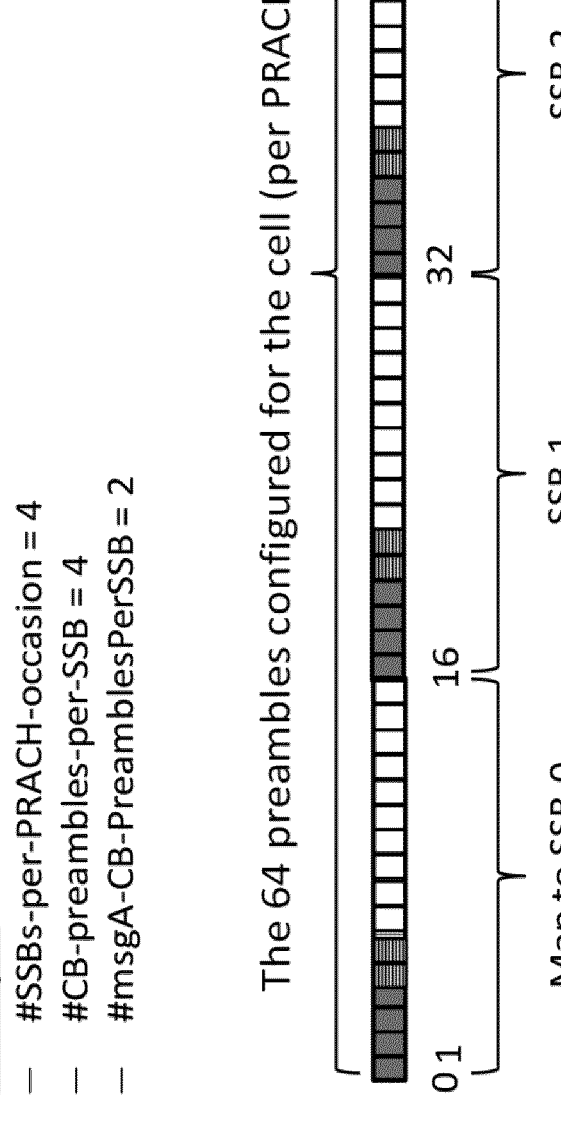
FIG. 9 illustrates the associated preambles for CBRA and CFRA per SSB per PRACH occasion, when random access channel occasions (ROs) for 2-step RACH and 4-step RACH are shared.

In this application, the term "node" can be a network node or a user equipment (UE). Examples of network nodes include, but are not limited to, a NodeB, a base station (BS), a multi-standard radio (MSR) radio node such as a MSR BS, an eNodeB, a gNodeB, a Master eNB (MeNB), a Secondary eNB (SeNB), integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, remote radio unit (RRU), remote radio head (RRH), nodes in distributed antenna system (DAS), core network node (e.g. MSC, MME, etc.), O&M, OSS, SON, positioning node (e.g. E-SMLC).

In this application, the term "user equipment" or "UE" is a non-limiting term that refers to any type of wireless device communicating with a network node and/or with another UE in a cellular or mobile communication system. Examples of UEs include, but are not limited to, a target device, a device to device (D2D) UE, a vehicular to vehicular (V2V), a machine type UE, an machine type communication (MTC) UE, a UE capable of machine to machine (M2M) communication, a PDA, a Tablet, a mobile terminal(s), a smart phone, laptop embedded equipment (LEE), laptop mounted equipment (LME), and USB dongles.

In this application, the terms "radio network node," "network node," and "NW node" is generic terminology that refers to any kind of network node including but not limited to a base station, a radio base station, a base transceiver station, a base station controller, a network controller, an evolved Node B (eNB), a Node B, a gNodeB (gNB), a relay node, an access point (AP), a radio access point, a Remote Radio Unit (RRU), a Remote Radio Head (RRH), a Central Unit (e.g. in a gNB), a Distributed Unit (e.g. in a gNB), a Baseband Unit, a Centralized Baseband, and a C-RAN.

In this application, the term "radio access technology" or "RAT" may refer to any RAT including, for example and without limitation, UTRA, E-UTRA, narrow band internet of things (NB-IoT), WiFi, Bluetooth, next generation RAT, New Radio (NR), 4G, and 5G. Any of the equipment denoted by the terms "node," "network node," or "radio network node" may be capable of supporting a single or multiple RATs.

3. Aspects

In some aspects, a network node 104 may configure different physical random access channel (PRACH) configurations for different UE/service groups that are associated to different priorities, different service types, and/or different network slices. In some aspects, a UE 102 may select which configuration to use for random-access preamble transmission based on the associated group of the access request. In some aspects, by detection of the random-access preamble transmitted from a UE 102, the network node 104 can identify the UE priority, service type, and/or configured network slice ID. In some aspects, based on the identified UE priority, service type, and/or configured network slice ID, the UE 102 may make an early decision on differentiated admission control for this UE 102.

In some aspects, UEs 102 may be pre-configured to different groups depending on the UE priority/type, its service priority/type, and/or its configured network slices. For example, in some aspects, different groups may be defined based on the UE Access Identity numbers or/and Access Categories. For another example, different groups may be defined based on the network slice IDs. For yet another example, different groups may be defined based on the service type (e.g., Mobile Broadband (MBB), Mission Critical Services, small data transmission (SDT), air-to-ground communications (A2G), etc.).

In some aspects, in addition to the legacy NR Rel-15 PRACH configuration for 4-step random access procedure, at least one additional PRACH configuration may be added in the system information block 1 (SIB1), where the legacy and the newly added PRACH configurations are associated to different groups. In some aspects, these different groups may be defined based on the UE/service priority, UE/service type, and/or network slice IDs. In some aspects, if only one additional PRACH configuration is added, then the added PRACH configuration may be associated with a UE/Service group that has a higher priority. In some aspects, if two or more additional PRACH configurations are added, then the legacy PRACH configuration may be associated with the lowest priority group. In some aspects, the legacy and the one or more newly added PRACH configurations may be differentiated in at least one of the following parameters: valid PRACH occasions, PRACH periodicities, preamble formats, and configured preamble indexes per PRACH occasion.

Different aspects of methods, apparatuses (e.g., UEs 102 and/or network nodes 104), and systems for configuring an additional PRACH configuration (e.g., in SIB1) are described below. Any of these aspects may be extended for the cases where two or more PRACH configurations are added. The aspects and examples below focus on the case of defining different PRACH configurations based on the UE/service priority level. The methods may be used for defining different PRACH configurations based on the UE/service type, network slice IDs, etc.

3.1 Differentiated PRACH Occasions

In some aspects, PRACH occasions for one or more newly added PRACH configurations may be configured separately from the PRACH occasions configured by the legacy configuration. In some aspects, as described below, the different PRACH occasions may be associated with different priorities (e.g., different UE priorities or different service priorities). However, this is not required, and, in some alternative aspects, the different PRACH occasions may be used be associated with different types (e.g., different UE types or different service types) or different network slices.

3.1.1 PRACH Occasions Separated in Time Domain

In some aspects, the PRACH occasions for the newly added PRACH configuration and the legacy PRACH occasions may be separated in the time domain.

Figure 10:
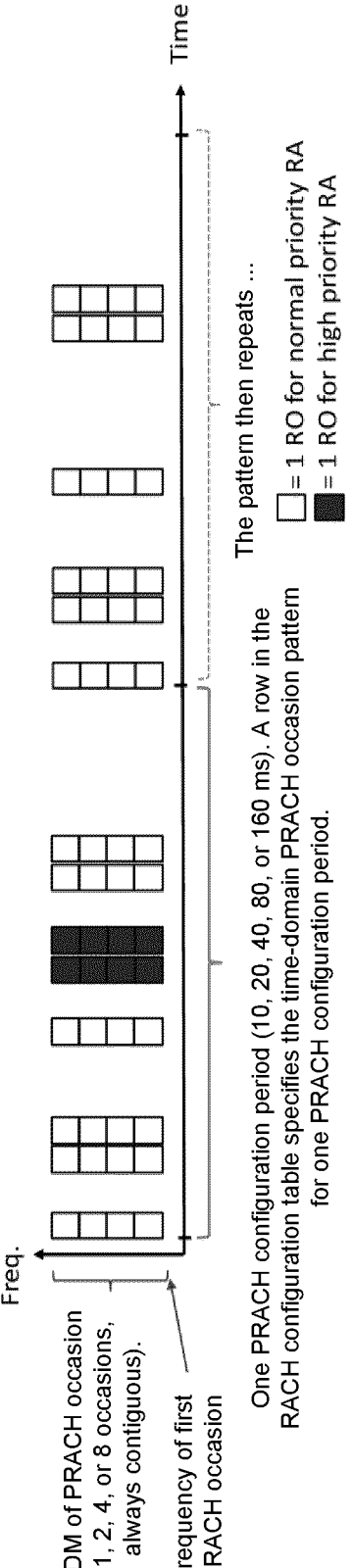
FIG. 10 illustrates time divisional multiplexed random access channel occasions between normal priority random access and high priority random access according to some aspects.

As an example, in some aspects, the PRACH configuration tables specified in TS 38.211 may be reused for the new PRACH configuration. In some aspects, a new PRACH configuration index parameter (e.g., prach-ConfigurationIndex-HighPriority) may be added in SIB1 for the new PRACH configuration. In some aspects, the new PRACH configuration index parameter may indicate a different set of PRACH occasions in the time domain. In some aspects, the new PRACH configuration index parameter may point to a different row in the associated PRACH configuration table as compared to the one for the legacy configuration, so that the valid PRACH occasions for the newly added PRACH configuration and the legacy PRACH configuration are different in the time domain. As illustrated in FIG. 10, the PRACH configuration periods for normal priority RA and high priority RA may be the same, but the Random Access Channel (RACH) occasions (ROs) may be in different subframes and, thus, separated in the time domain.

In some aspects, by allocating ROs that can be used by high priorities UEs for transmitting a random access preamble, the network node 104 is able to grant earlier access for the high priority UEs (at the cost of fewer grants to low priority users). In some aspects, the ROs allocated for high priority UEs may be earlier in time than ROs for non-high priority UEs.

In one embodiment, the sets of PRACH configuration tables can be: (i) the same sets of PRACH configuration tables that are used for 4-step RACH, (ii) separately defined PRACH configuration tables, and/or (iii) modified tables based on existing tables used for 4-step RACH.

3.1.2 PRACH Occasions Separated in Frequency Domain

In some aspects, the PRACH occasions for the newly added PRACH configuration and the legacy PRACH occasions may be separated in the frequency domain.

Figure 11:
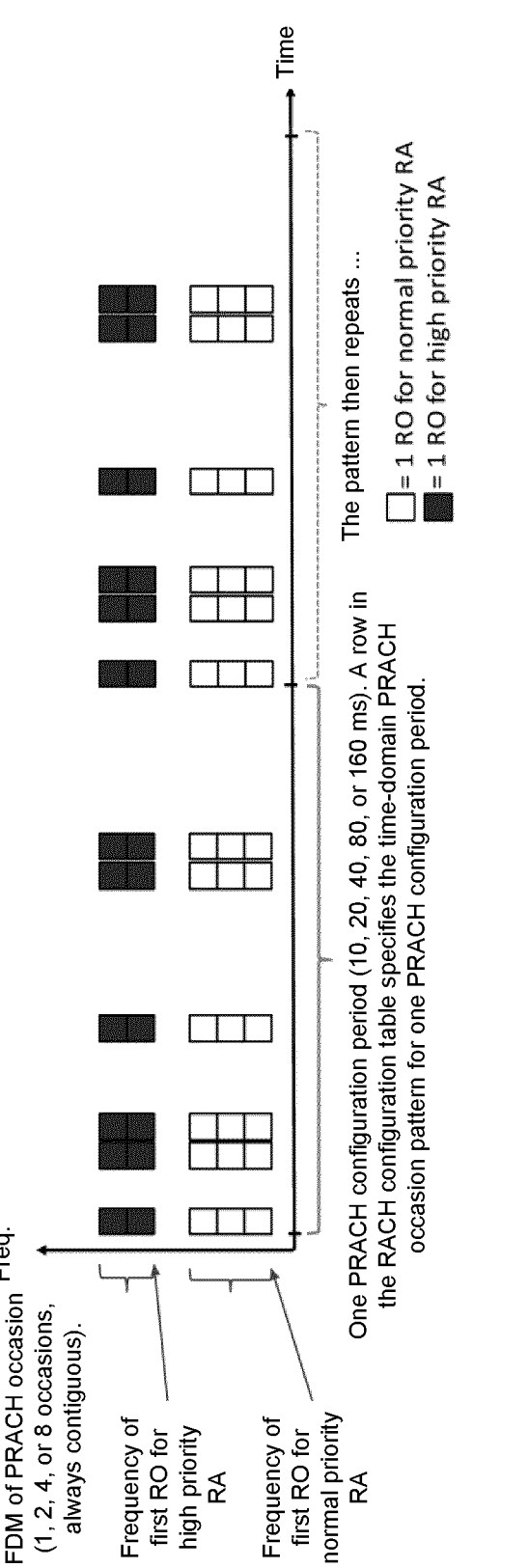
FIG. 11 illustrates frequency divisional multiplexed random access channel occasions between normal priority RA and high priority RA (separate start RO indication) according to some aspects.

As an example, in some aspects, two new higher-layer parameters (e.g., msg1-FrequencyStart-HighPriority and msg1-FDM-HighPriority) may be added for the new PRACH configuration. In some aspects, the two new higher-layer parameters may be added for the new PRACH configuration to indicate a different set of PRACH occasions in the frequency domain. In some aspects, the first parameter may be a frequency start parameter (e.g., msg1-FrequencyStart-HighPriority) that indicates the start position in frequency for the new PRACH occasions. In some aspects, the frequency start parameter may indicate (a) a frequency offset of the lowest new PRACH occasion in frequency with respect to the lowest resource block (RB) of the configured uplink (UL) bandwidth part (BWP) or (b) a frequency offset of the lowest new PRACH occasion in frequency with respect to the lowest RB configured for the legacy PRACH occasion. In some aspects, the second parameter may be a frequency division multiplexing parameter (e.g., msg1-FDM-HighPriority) that indicates the number of PRACH occasions for high priority random access that are frequency division multiplexed (FDMed) at one time instance. FIG. 11 illustrates the FDMed RACH occasions (ROs) when msg1-FDM-HighPriority=2.

Figure 12:
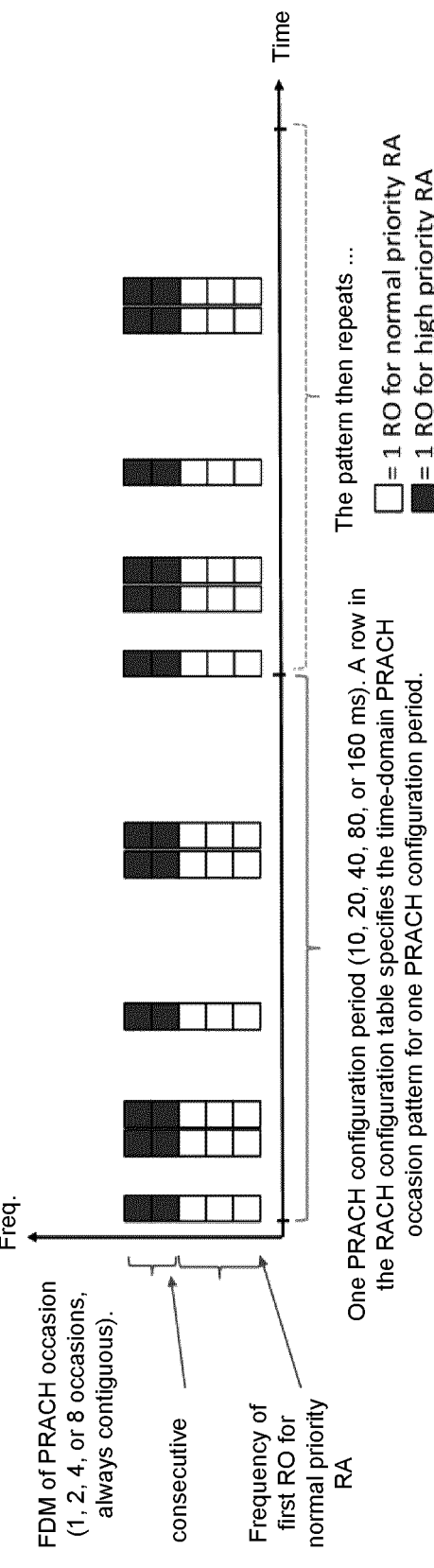
FIG. 12 illustrates frequency division multiplexed ROs in which ROs for high priority random access and ROs for normal priority random access are separated but consecutive in the frequency domain according to some aspects.

As another example, in some aspects, to avoid frequency resource segmentation for UL data scheduling, the legacy PRACH occasions and the new PRACH occasions may be configured to be consecutive in the frequency domain. In some aspects, two new higher-layer parameters (e.g., msg1-FrequencyStart-HighPriority and msg1-FDM-HighPriority) may be added for the new PRACH configuration to indicate a different set of PRACH occasions in the frequency domain, where the new PRACH occasions are separated but consecutive in the frequency domain. In some aspects, the first parameter may be a frequency start parameter (e.g., msg1-FrequencyStart-HighPriority) that indicates the starting position of the new PRACH occasions in the frequency domain. In some aspects, the frequency start parameter may be configured as a flag that indicates whether the new PRACH occasions in frequency are configured to start from (a) the highest legacy PRACH occasion in frequency and added upwards or (b) the lowest legacy PRACH occasion in frequency and added downwards. In some aspects, the second parameter may be a frequency division multiplexing parameter (e.g., msg1-FDM-HighPriority) that indicates the number of PRACH occasions for high priority random access that are frequency division multiplexed (FDMed) at one time instance. FIG. 12 illustrates an example in which two (e.g., msg1-FDM-HighPriority=2) consecutive ROs for high priority random access are added upwards.

In an alternative embodiment with new PRACH occasions separated but consecutive in the frequency domain, the start of the high priority RO can be relative to the start of the normal priority PO (e.g. an offset can be signaled from high layer to indicate the offset number of PRBs, which can be positive and/or negative).

3.1.3 PRACH Occasions Separated in Time and Frequency Domains

In some aspects, the PRACH occasions for the newly added PRACH configuration and the legacy PRACH occasions may be separated in both the time and frequency domains. In some aspects, separation in both the time and frequency domains may be achieved using the combination of the aspects described in Sections 3.1.1 and 3.1.2 above. In some aspects, three new higher layer parameters (e.g., prach-ConfigurationIndex-HighPriority, msg1-FrequencyStart-HighPriority, and msg1-FDM-HighPriority) may be added for the new indicate a different set of PRACH occasions in both the time and frequency domain. In some aspects, the three parameters may include (i) a PRACH configuration index parameter (e.g., prach-ConfigurationIndex-HighPriority) to indicate a different set of PRACH occasions in the time domain, (ii) a frequency start parameter (e.g., msg1-FrequencyStart-HighPriority) that indicates the starting position of the new PRACH occasions in the frequency domain, and (iii) a frequency division multiplexing parameter (e.g., msg1-FDM-HighPriority) that indicates the number of PRACH occasions for high priority random access that are frequency division multiplexed (FDMed) at one time instance.

In some of the aspects described above in which ROs for different priority random access are separated in the time domain, in the frequency domain, or the time and frequency domains, when the newly configured ROs overlap with the legacy ROs, one or more of the following rules may be applied: (i) the overlapped ROs are only used for normal priority UEs, (ii) the overlapped ROs are only used for higher priority UEs, (iii) it's up to network to make sure the ROs are not overlapped, and (iv) allow the overlapped ROs to be used by both types of UEs and rely on later steps to differentiate the higher priority (e.g., mission critical (MC)) UEs.

3.2 Differentiated Preamble Formats and/or Periodicities

In some of the aspects described in Section 3.1 above in which ROs for different priority random access are separated in the time domain, in the frequency domain, or the time and frequency domains, a different periodicity and/or a different preamble format may be configured for the new PRACH configuration. For instance, in some aspects, a shorter PRACH configuration periodicity is configured for the high priority UE PRACH configuration to allow faster connection establishment in case there are many connection requests from high priority UEs. In some aspects, a preamble format with long sequence length may be configured for the high priority UE PRACH configuration to improve the coverage of the preamble transmission from high priority UEs.

For some aspects in which ROs for different priority random access are separated in the time domain or the time and frequency domains (see Sections 3.1.1 and 3.1.3 above), the different periodicity and/or different preamble format may be achieved by selecting the value of the new PRACH configuration index (e.g., prach-ConfigurationIndex-High-Priority) so that it does not only give a different set of PRACH occasions in time but also a different periodicity and/or preamble format. For some aspects in which ROs for different priority random access are separated in the frequency domain (see Section 3.1.2 above), the different periodicity and/or different preamble format may be achieved by adding a new PRACH configuration index that gives the same PRACH occasions in time as for legacy but with a different periodicity or/and preamble format.

In some aspects, a new PRACH configuration index parameter (e.g., prach-ConfigurationIndex-HighPriority) may be added in SIB1 for the new PRACH configuration to indicate a different PRACH configuration periodicity and/or different preamble format.

In some aspects, the different periodicities and/or different preamble formats may be associated with different priorities (e.g., different UE priorities or different service priorities). However, this is not required, and, in some alternative aspects, the different periodicities and/or different preamble formats may be used be associated with different types (e.g., different UE types or different service types) or different network slices.

3.3 Differentiated Preamble Indexes Per PRACH Occasion

In some aspects, different UE priority groups may share the same configuration of valid PRACH occasions, but the different UE priority groups may be configured with non-overlapping sets of preamble indexes per PRACH occasion. In some aspects, the non-overlapping sets of preamble indexes per PRACH occasion may be associated with different priorities (e.g., different UE priorities or different service priorities). However, this is not required, and, in some alternative aspects, the non-overlapping sets of preamble indexes per PRACH occasion may be used be associated with different types (e.g., different UE types or different service types) or different network slices.

3.3.1 Differentiated Preamble Indexes Per PRACH Occasion by Reusing the Existing Preamble Group a and Group B Concept in NR In some aspects, the existing preamble group A and group B concept in NR may be reused to obtain the different UE priority groups may be configured with non-overlapping sets of preamble indexes per PRACH occasion. In some aspects, the random-access preambles group B is configured for contention based random access (CBRA) in RACH-Config-Common in SIB1, and the preambles in group B are associated to the high priority group. In some aspects, the RRC parameter messagePowerOffestGroupB in RACH-Config-Common may be set to "minusinfinity", and the RRC parameter ra-Msg3SizeGroupA in RACH-ConfigCommon may be set to "b1000" (e.g., the largest size). In some aspects, a new UE behavior may be added such that a UE associated to the high priority group will select the preambles within group B for contention based random access.

Figure 13:
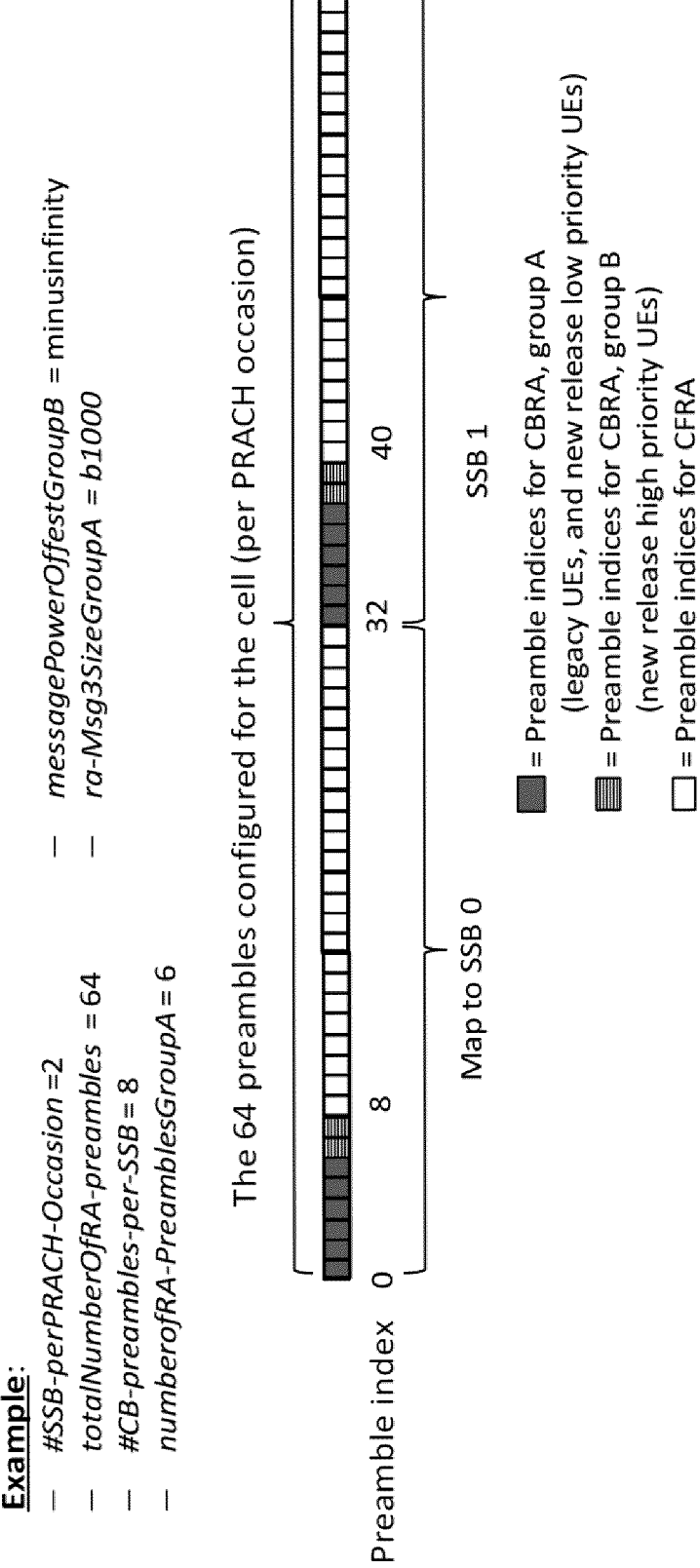
FIG. 13 illustrates the associated preambles for CBRA and CFRA per SSB per PRACH occasion, where Random Access Preambles group B is configured for UEs associated to the high priority group according to some aspects.

In some aspects, as illustrated in FIG. 13, legacy UEs may follow the legacy preamble selection procedure and select random access preambles from group A (e.g., for msg1 transmission). In some aspects, for new release UEs, UEs associated to a high priority group will select preambles from group B, and the rest of the UEs will select preambles from group A for msg1 transmission. A RACH-ConfigCommon information element with the random-access preambles group B configured for CBRA according to some embodiments is shown below.

```
-- ASN1START
-- TAG-RACH-CONFIGCOMMON-START
RACH-ConfigCommon ::=                                SEQUENCE {
    Rach-ConfigGeneric                                   RACH-ConfigGeneric,
    totalNumberOfRA-Preambles                            INTEGER (1 .. 63)   OPTIONAL, --Need S
    ssb-perRACH-OccasionANDCB-PreamblesPerSSB              CHOICE {
        oneEighth                                            ENUMERATED {n4, n8, n12, n16,
                                                                 n20, n24, n28, n32, n36, n40,
                                                                 n44, n48, n52, n56, n60, n64},
        oneFourth                                            ENUMERATED {n4, n8, n12, n16,
                                                                 n20, n24, n28, n32, n36, n40,
                                                                 n44, n48, n52, n56, n60, n64},
        oneHalf                                              ENUMERATED {n4, n8, n12, n16,
                                                                 n20, n24, n28, n32, n36, n40,
                                                                 n44, n48, n52, n56, n60, n64},
        one                                                  ENUMERATED {n4, n8, n12, n16,
                                                                 n20, n24, n28, n32, n36, n40,
                                                                 n44, n48, n52, n56, n60, n64},
        two                                                  ENUMERATED {n4, n8, n12, n16,
                                                                 n20, n24, n28, n32},
```

-continued

| | |
|---|---|
| four | INTEGER (1 . . 16), |
| eight | INTEGER (1 . . 8), |
| sixteen | INTEGER (1 . . 4), |
| } | OPTIONAL,  -- Need M |
| groupBconfigured | SEQUENCE { |
| ra-Msg3SizeGroupA | ENUMERATED {b56, b144, b208, b256, b282, |
| | b480, b640, b800, b1000, b72, spare6, |
| | spare5, spare4, spare3, spare2, spare1}, |
| messagePowerOffsetGroupB | ENUMERATED { minusinfinity, dB0, dB5, dB8, |
| | dB10, dB12, DB15, dB18}, |
| numberOfRA-PreamblesGroupA | INTEGER (1 . . 64) |
| } | |

3.3.2 Differentiated Preamble Indexes Per PRACH Occasion by Introducing a Separate Configuration for Preamble Indexes for the New RACH Configuration In some aspects, a separate configuration may be used for preamble indexes for the RACH configuration for high priority UEs. In some aspects, a new RRC parameter (e.g., totalNumberofRA-Preambles-High Priority) may be added in RACH-ConfigCommon in SIB1 to indicate a different set of preamble indexes per RACH occasion for UEs associated with the high priority group. In some aspects, the network node 104 may configure the value of the totalNumberofRA-Preambles-HighPriority parameter such that it can be evenly divided by the number of SSBs associated to one PRACH occasion, and totalNumberofRA-Preambles+totalNumberofRA-Preambles-HighPriority <=64.

Figure 14:
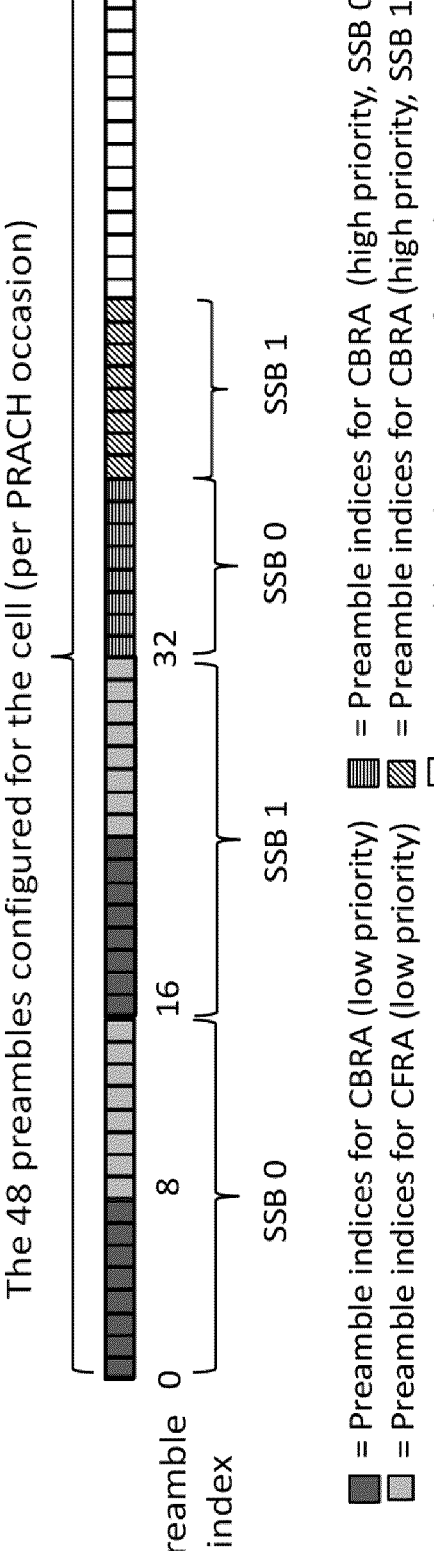
FIG. 14 illustrates associated preambles for CBRA and CFRA per SSB per PRACH occasion, where separate preambles are configured for UEs associated to the high priority group according to some aspects.

FIG. 14 shows an example of the association between the SSB and the preambles when a separate set of preambles are configured for high priority UEs. In some aspects, a network node 104 may provide a UE 102 with two SSBs associated with one PRACH occasion and eight of contention-based preambles per SS/PBCH block per valid PRACH occasion. In some aspects, the eight contention based preambles with consecutive indexes associated with SSB 0 per valid PRACH occasion may start from preamble index totalNumberofRA-Preambles. In example shown in FIG. 14, the preamble index totalNumberofRA-Preambles is 32, and the 8 contention based preambles with consecutive indexes associated with SSB 1 per valid PRACH occasion start from preamble index totalNumberofRA-Preambles+8, which is 40 in the example shown in FIG. 14.

In some alternative aspects, an independent set of preambles can be configured for high priority random access (RA), where the set of preambles can be out of the set of maximum 64 preambles that are used for normal random access. In some aspects, a different root value or cyclic shift values can be used for generation of additional preamble sequences unique for high priority RA.

In some alternative aspects, high priority UEs may be allowed to transmit PRACH preambles with higher power as compared to non-high priority UEs. In some aspects, the higher power may be specified by a separate high priority value that is an amplitude scaling factor in section 6.3.3.2 of 3GPP TS 38.211. In some alternative aspects, different values of the higher layer parameter PREAMBLE_RECEIVED_TARGET_POWER may be specified for high and non-high priority UEs (e.g., in accordance with 3GPP TS 38.213 section 7.4).

In some alternative aspects, high priority UEs may be allowed to transmit PRACH preambles with higher power for each re-tranmissions of PRACH preambles (e.g., using the powerRampingStep in 3GPP 38.321 section 5.1.1).

3.4 High Priority Random Access (RA) with 2-Step RACH

In some aspects, all the aspects described above may be used for 2-step RACH in which the resources used for the transmission of msgA preamble part are used to differentiate the high priority UEs and normal UEs. In some aspects, the resources may be: (i) valid PRACH occasions, (ii) PRACH periodicities, (iii) preamble formats, and/or (iv) configured preamble indexes per PRACH occasion.

In some aspects, using the msgA preamble part to differentiate the high priority UEs and normal UEs may enable the network node 104 to quickly determine whether detected UE is a high priority UE (e.g., even if a msgA PUSCH cannot be correctly decoded, in which case network can do a quick fallback via transmitting a fallback RAR in message B so that UE can provide more information in a msg3 PUSCH, which is more reliable than msgA PUSCH which can collide with other UEs on the same time frequency or even DMRS resources).

In some aspects, the msgA PUSCH may additionally or alternatively provide explicit signaling to indicate which priority the UE has. In some aspects, the signaling may be: (i) UE access ID, (ii) an alarm type (e.g. fire, earthquake, flood, traffic accident), (iii) a service type, and/or (iv) UE position information. In some aspects, a separate set of msgA PUSCH resources may be configured/reserved for high priority UEs, and the PUSCH resource may be be: (i) a demodulation reference signal (DMRS) resource for msgA PUSCH including a DMRS port and/or a DMRS sequence, (ii) a time and/or frequency resource for msgA PUSCH, (iii) power control related parameters for msgA PUSCH including a power ramping step size, a power ramping counter, a power offset relative to the preamble received target power, a power scaling factor for scaling an estimated path loss, and/or a transmit power command (TPC), (iv) a listen before talk (LBT) type of msgA PUSCH, (v) a cyclic prefix (CP) extension of msgA PUSCH, (vi) a frequency hopping configuration of msgA PUSCH, (vii) a waveform of msgA PUSCH, (viii) an interlace configuration of msgA PUSCH, and/or (ix) a modulation coding scheme (MCS) configuration of msgA PUSCH.

In some high priority random Access (RA) with 2-step RACH aspects, a separately configured/reserved PUSCH resource may enhance msgA PUSCH performance (e.g., by providing a low collision probability in time and frequency, lower MCS, low latency, higher power, and/or enabling of frequency hopping).

In some aspects, as described above, the resources used for the transmission of msgA preamble part may be used to differentiate the high priority UEs and normal UEs. In some alternative aspects, the resources used for the transmission of msgA preamble part may be used to differentiate the high priority services and normal services. In some alternative aspects, the resources used for the transmission of msgA preamble part may be used to differentiate different types (e.g., different UE types or different service types) or different network slices.

3.5 Flowcharts

In some aspects, for 2-step RACH and/or 4-step RACH, a network node 104 may configure different random-access preamble configurations (e.g., PRACH occasions, preamble index, or preamble format) for different UE/service groups that are associated to different priorities, different service types, or/and different network slice IDs. In some aspects, a UE 102 may select which configuration to use for the random-access preamble transmission based on the associated group of its access request.

In some aspects, in 2-step RACH, a network node 104 may configure different msgA PUSCH resources for different groups based on UE/Service priority, UE/service type, or/and network slice ID. In some aspects, a higher priority UE 102 may then select the separate msgA PUSCH resource so that a more reliable msgA PUSCH can be used to inform the network node 104 of the UE priority.

Figure 15:
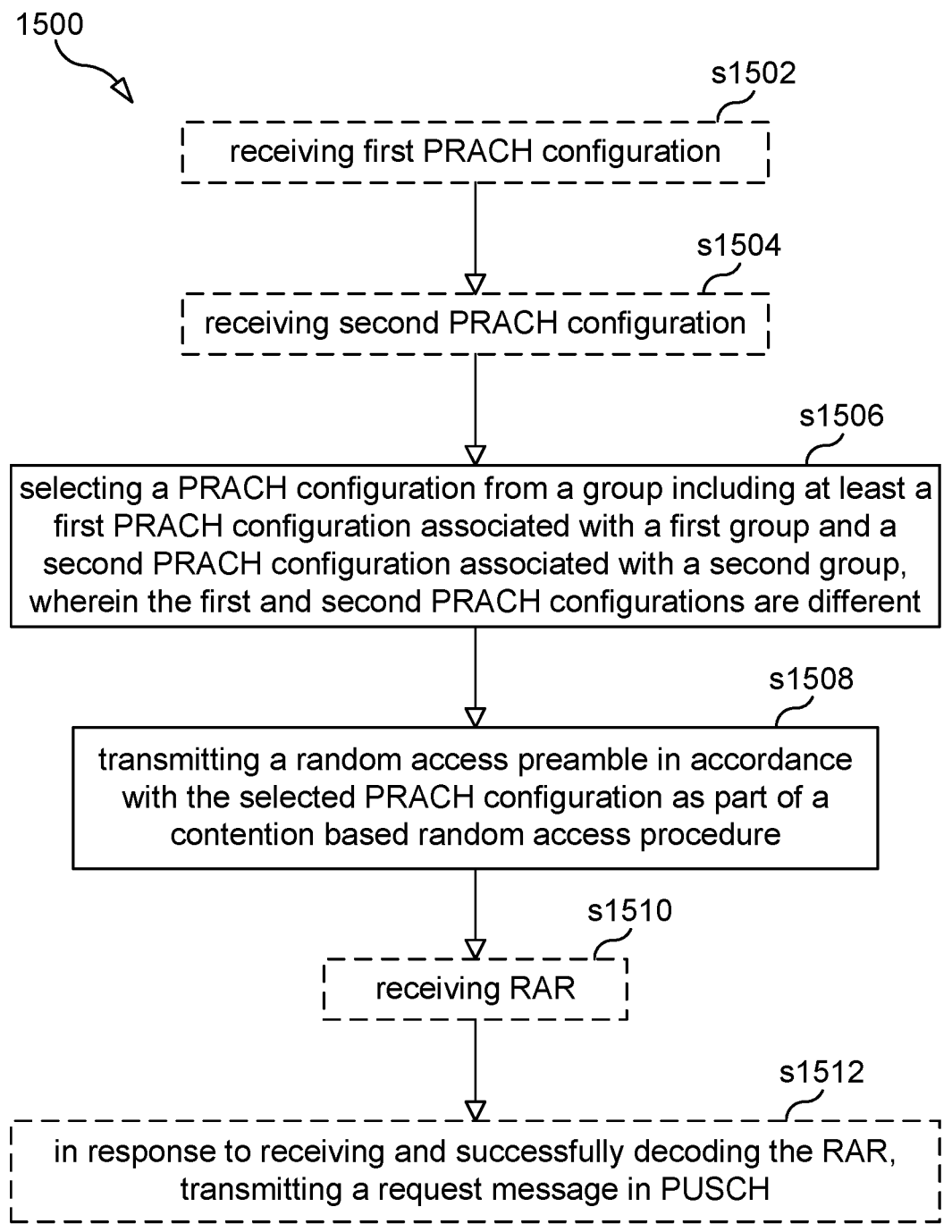
FIG. 15 is a flow chart illustrating a process performed by a user equipment according to some aspects.

FIG. 15 illustrates a process 1500 performed by a user equipment (UE) 102 according to some aspects. In some aspects, the process 1500 may include optional steps 1502 and 1504 in which the UE 102 receives first and second physical random access channel (PRACH) configurations, respectively. In some aspects, the first and second PRACH configurations may be received as part of a system information block (e.g., SIB1).

In some aspects, the process 1500 may include a step 1506 in which the UE 102 selects a PRACH configuration from a group including at least the first and second PRACH configurations. In some aspects, the first and second PRACH configurations may be associated with first and second groups, respectively. In some aspects, the first and second PRACH configurations may be different. In some aspects, the first and second PRACH configurations may be different in at least one of the following parameters: valid PRACH occasions, PRACH configuration periodicities, preamble formats, and configured preamble indexes per random access occasion.

In some aspects, the group may further include a third PRACH configuration associated with a third group. In some aspects, the first, second, and third PRACH configurations may be different. In some aspects, the first, second, and third PRACH configurations may be received in a system information block (e.g., SIB1).

In some aspects, the selection in step 1506 may be based on a priority of the UE 102, a type of the UE 102, a priority of a service, a type of the service, and/or a network slice.

In some aspects, the selection in step 1506 may be based on a priority of the UE 102. In some aspects (e.g., some selection based on UE priority aspects), the first group may be associated with a first priority, the second group may be associated with a second priority, the second priority may be higher than the first priority, the first PRACH may be selected in step 1506 if the UE has the first priority, and the second PRACH may be selected in step 1506 if the UE has the second priority.

In some aspects, the selection in step 1506 may be based on a type of the UE 102. In some aspects (e.g., some selection based on UE type aspects), the second group may be associated with a set of one or more UE types, and the second PRACH may be selected in step 1506 if the type of the UE 102 is within the set of one or more UE types. In some aspects, the set of one or more UE types may include, for example and without limitation, a mission critical (MC) UE and/or a multimedia priority UE. In some aspects, the first group may be associated with a different set of one or more UE types, and the first PRACH may be selected in step 1506 if the type of the UE 102 is within the different set of one or more UE types. In some aspects, the type of the UE may be a subscription type.

In some aspects, the process 1500 may be for establishing a connection with the network node 104 to obtain a service. In some aspects, the service may be, for example and without limitation, an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, and/or an air-to-ground communication (A2G) service.

In some aspects, the selection in step 1506 may be based on a priority of the service. In some aspects (e.g., some selection based on service priority aspects), the first group may be associated with a first priority, the second group may be associated with a second priority, the second priority may be higher than the first priority, the first PRACH may be selected in step 1506 if the service has the first priority, and the second PRACH may be selected in step 1506 if the service has the second priority.

In some aspects, the selection in step 1506 may be based on a type of the service. In some aspects (e.g., some selection based on service type aspects), the second group may be associated with a set of one or more service types, and the second PRACH may be selected if the type of the service is within the set of one or more service types. In some aspects, the set of one or more service types may include, for example and without limitation, an MC service. In some aspects (e.g., some selection based on service type aspects), the first group may be associated with a different set of one or more service types, and the first PRACH may be selected in step 1506 if the type of the service is within the different set of one or more service types. In some aspects, the type of the service may be one of an emergency call, an MC service, a multimedia priority service, a MBB service, an eMBB service, a V2X service, a television broadcast, an SDT service, or an A2G service.

In some aspects, the selection in step 1506 may be based on a network slice identification (ID). In some aspects (e.g., some selection based on network slice aspects), the second group may be associated with a set of one or more network slice IDs, and the second PRACH is selected in step 1506 if the network slice ID is within the set of one or more network slice IDs. In some aspects (e.g., some selection based on network slice aspects), the first group may be associated with a different set of one or more network slice IDs, and the second PRACH may be selected in step 1506 if the network slice ID is within the different set of one or more network slice IDs.

In some aspects, the process 1500 may include a step 1508 in which the UE 102 transmits a random access preamble in accordance with the selected PRACH configuration. In some aspects (e.g., 2-step random access procedure aspects), the step 1508 may include the UE 102 transmitting a request message in physical uplink shared channel (PUSCH) with the random access preamble.

In some aspects, the process 1500 may further include an optional step 1510 in which the UE 102 receives a random access response (RAR) to the transmitted random access preamble. In some aspects (e.g., 2-step random access procedure aspects), the RAR may include a UE identifier assignment, timing advance information, and a contention resolution message.

In some aspects (e.g., 4-step random access procedure aspects), the process 1500 may further include an optional step 1512 in which the UE 102, in response to receiving and successfully decoding the RAR, transmits a request message in physical uplink shared channel (PUSCH) (e.g., for requesting terminal identification and radio resource control (RRC) connection establishment).

In some aspects, PRACH occasions of the first PRACH configuration may be separated from PRACH occasions of the second PRACH configuration in the time domain (e.g., as shown in FIG. 10). In some aspects, a PRACH configuration index parameter in a system information block may indicate the PRACH occasions of the second PRACH configuration. In some aspects, the UE 102 may transmit the random access preamble in step 1508 in a PRACH occasion of the first PRACH configuration if the first PRACH configuration is selected in step 1506, and the UE 102 may transmit the random access preamble in step 1508 in a PRACH occasion of the second PRACH configuration if the second PRACH configuration is selected in step 1506.

In some aspects, PRACH occasions of the first PRACH configuration may be separated from PRACH occasions of the second PRACH configuration in the frequency domain (e.g., as shown in FIGS. 11 and 12). In some aspects, a frequency start parameter may indicate the start position in frequency for the PRACH occasions of the second PRACH configuration. In some aspects, a frequency division multiplexing parameter may indicate the number of PRACH occasions of the second PRACH configuration frequency division multiplexed at one time instance. In some aspects, PRACH occasions of the first PRACH configuration and PRACH occasions of the second PRACH configuration may be consecutive in the frequency domain at one time instance (e.g., as shown in FIG. 12). In some aspects, the UE 102 may transmit the random access preamble in step 1508 in (a) a PRACH occasion of the first PRACH configuration if the first PRACH configuration is selected in step 1506 or (b) a PRACH occasion of the second PRACH configuration if the second PRACH configuration is selected in step 1506.

In some aspects, the first PRACH configuration may have a first periodicity, the second PRACH configuration may have a second periodicity, and the first and second periodicities may be different. In some aspects, the second periodicity may be shorter than the first periodicity. In some aspects, the first PRACH configuration may have a first preamble format, the second PRACH configuration may have a second preamble format, and the first and second preamble formats may be different. In some aspects, the second preamble format may have longer sequence length than the first preamble format.

In some aspects, the first PRACH configuration may have a first set of preamble indexes per PRACH occasion, the second PRACH configuration may have a second set of preamble indexes per PRACH occasion, and the first and second sets of preamble indexes may not overlap (e.g. as shown in FIGS. 13 and 14). In some aspects, the first set of preamble indexes may be preamble indexes in preamble group A for contention based random access, and the second set of preamble indexes are preamble indexes in preamble group B for contention based random access (e.g., as shown in FIG. 13). In some aspects, a first parameter may indicate a total number of preamble indexes in the first set, and a second parameter may indicate a total number of preamble indexes in the second set (e.g., as shown in FIG. 14). In some aspects, a value of the second parameter may be evenly dividable by a number of synchronization signals/physical broadcast channel blocks (SSBs). In some aspects, a value of the first parameter plus a value of the second parameter may be less than or equal to 64. In some aspects, the UE 102 may transmit the random access preamble in step 1508 using (a) one or more preamble indexes of the first set of preamble indexes if the first PRACH configuration is selected in step 1506 or (b) one or more preamble indexes of the second set of preamble indexes if the second PRACH configuration is selected in step 1506.

In some aspects, the first PRACH configuration may include a first set of preambles, the second PRACH configuration may include a second set of preambles, and the first and second sets may be mutually exclusive. In some aspects, the preambles of the second set may be generated using different root values and/or cyclic shift values than those used to generate the preambles of the first set. In some aspects, the UE 102 may transmit the random access preamble in step 1508 using (a) a preamble of the first set of preambles if the first PRACH configuration is selected in step 1506 or (b) a preamble of the second set of preambles if the second PRACH configuration is selected in step 1506.

In some aspects, a random access preamble in accordance with the second PRACH configuration may be transmitted at a higher power than a random access preamble transmitted in accordance with the first PRACH configuration. In some aspects, a parameter in the first and second PRACH configurations may indicate the power at which the random access preamble transmitted. In some aspects, the UE 102 may transmit the random access preamble in step 1508 using (a) a relatively low power if the first PRACH configuration is selected in step 1506 or (b) a relatively high power if the second PRACH configuration is selected in step 1506.

In some aspects, the process 1500 may further include re-transmitting the random access preamble in accordance with the second PRACH configuration with a higher power than the previous transmission of the random access preamble in step 1508.

In some aspects (e.g., 2-step random access procedure aspects), the step 1508 of the process 1500 may further include transmitting with the random access preamble an explicit indication of the priority of the UE, the type of the UE, the priority of the service, the type of the service, and/or a network slice identification (ID) of the network slice on which the selection is based. In some aspects, the explicit indication may include a UE access identification, an alarm type, a service type, and/or UE position information.

In some aspects (e.g., 2-step random access procedure aspects), the step 1508 of transmitting the random access preamble in accordance with the second PRACH configuration may include transmitting a physical uplink shared channel (PUSCH) using a PUSCH resource reserved for a set of one or more UE types, one or more UE priorities, one or more service types, one or more service priorities, and/or one or more network slices. In some aspects, the reserved PUSCH resource may include: (i) a demodulation reference signal (DMRS) resource for msgA PUSCH including a DMRS port and/or a DMRS sequence, (ii) a time and/or frequency resource for msgA PUSCH, (iii) power control related parameters for msgA PUSCH including a power ramping step size, a power ramping counter, a power offset relative to the preamble received target power, a power scaling factor for scaling an estimated path loss, and/or a transmit power command (TPC), (iv) a listen before talk (LBT) type of msgA PUSCH, (v) a cyclic prefix (CP) extension of msgA PUSCH, (vi) a frequency hopping configuration of msgA PUSCH, (vii) a waveform of msgA PUSCH, (viii) an interlace configuration of msgA PUSCH, and/or (ix) a modulation coding scheme (MCS) configuration of msgA PUSCH.

Figure 16:
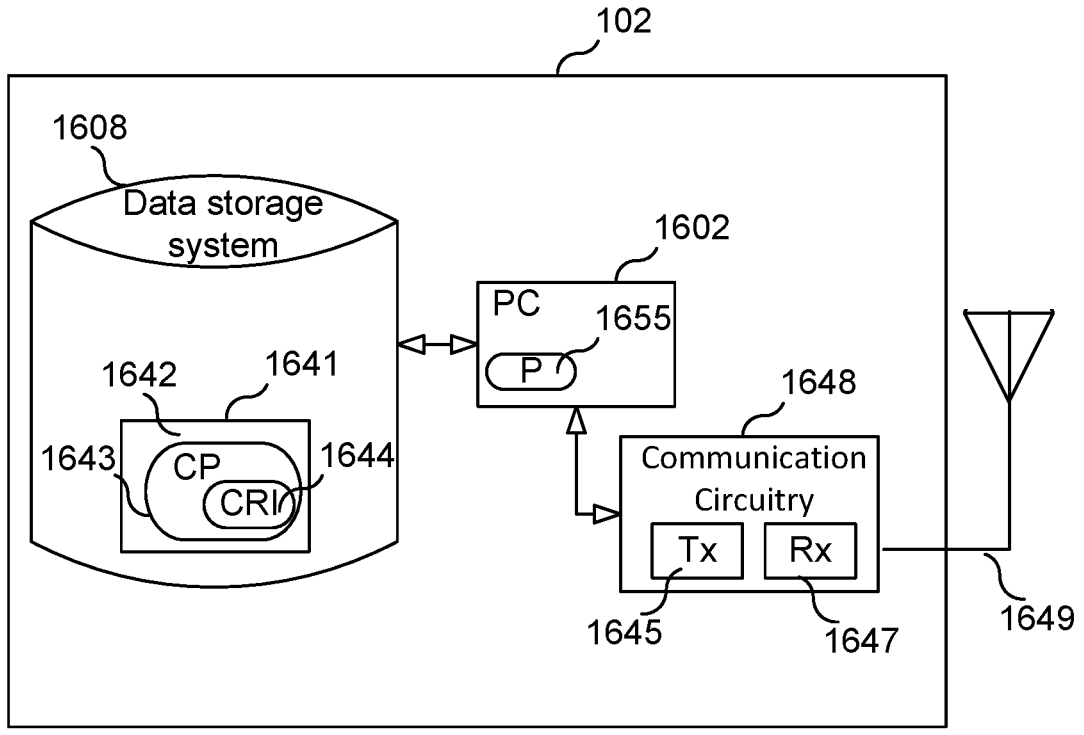
FIG. 16 is a block diagram of a user equipment according to some aspects.

FIG. 16 is a block diagram of UE 102, according to some aspects. As shown in FIG. 16, UE 102 may comprise: processing circuitry (PC) 1602, which may include one or more processors (P) 1655 (e.g., one or more general purpose microprocessors and/or one or more other processors, such as an application specific integrated circuit (ASIC), field-programmable gate arrays (FPGAs), and the like); communication circuitry 1648, which is coupled to an antenna arrangement 1649 comprising one or more antennas and which comprises a transmitter (Tx) 1645 and a receiver (Rx) 1647 for enabling UE 102 to transmit data and receive data (e.g., wirelessly transmit/receive data); and a local storage unit (a.k.a., "data storage system") 1608, which may include one or more non-volatile storage devices and/or one or more volatile storage devices. In some aspects where PC 1602 includes a programmable processor, a computer program product (CPP) 1641 may be provided. CPP 1641 includes a computer readable medium (CRM) 1642 storing a computer program (CP) 1643 comprising computer readable instructions (CRI) 1644. CRM 1642 may be a non-transitory computer readable medium, such as, magnetic media (e.g., a hard disk), optical media, memory devices (e.g., random access memory, flash memory), and the like. In some aspects, the CRI 1644 of computer program 1643 is configured such that when executed by PC 1602, the CRI causes UE 102 to perform steps described herein (e.g., steps described herein with reference to the flow charts). In other aspects, UE 102 may be configured to perform steps described herein without the need for code. That is, for example, PC 1602 may consist merely of one or more ASICs. Hence, the features of the aspects described herein may be implemented in hardware and/or software.

Figure 17:
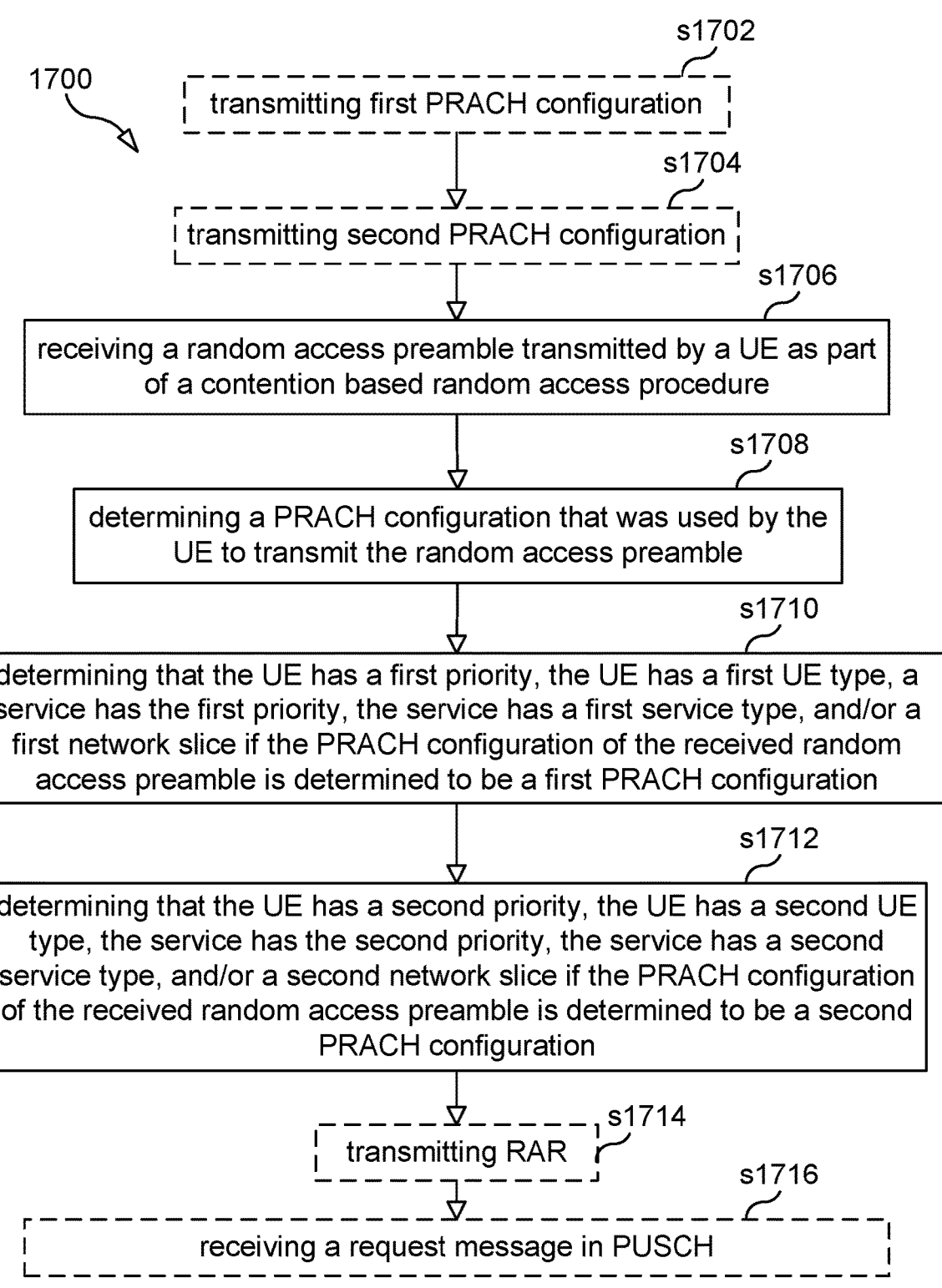
FIG. 17 is a flow chart illustrating a process performed by a network node according to some aspects.

FIG. 17 illustrates a process 1700 performed by a network node 104 according to some aspects. In some aspects, the process 1700 may include optional steps 1702 and 1704 in which the network node 104 transmits first and second physical random access channel (PRACH) configurations, respectively. In some aspects, the first and second PRACH configurations may be transmitted as part of a system information block (e.g., SIB1).

In some aspects, the process 1700 may include a step 1706 in which the network node 104 receives a random access preamble transmitted by a user equipment (UE) 102. In some aspects (e.g., 2-step random access procedure aspects), in the step 1706, the network node 104 may receive a request message in physical uplink shared channel (PUSCH) with the random access preamble.

In some aspects, the process 1700 may include a step 1708 in which the network node 104 determines a PRACH configuration that was used by the UE 102 to transmit the random access preamble.

In some aspects, the process 1700 may include a step 1710 in which the network node 104 determines that the UE 102 has a first priority, the UE 102 has a first UE type, a service has the first priority, the service has a first service type, and/or a first network slice if the PRACH configuration of the received random access preamble is determined to be a first PRACH configuration.

In some aspects, the process 1700 may include a step 1712 in which the network node 104 determines that the UE 102 has a second priority, the UE has a second UE type, the service has the second priority, the service has a second service type, and/or a second network slice if the PRACH configuration of the received random access preamble is determined to be a second PRACH configuration. In some aspects, the first and second PRACH configurations may be different. In some aspects, the first and second PRACH configurations may be different in at least one of the following parameters: valid PRACH occasions, PRACH periodicities, preamble formats, and configured preamble indexes per random access occasion.

In some aspects, the UE 102 may be attempting to establish a connection with the network node 104 to obtain the service. In some aspects, the service may be an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, or an air-to-ground communication (A2G) service.

In some aspects, the UE 102 may be determined to have the first priority in step 1710 if the PRACH configuration of the received random access preamble is determined to be a first PRACH configuration, the UE 102 may be determined to have the second priority in step 1712 if the PRACH configuration of the received random access preamble is determined to be a second PRACH configuration, and the second priority may be higher than the first priority.

In some aspects, the UE 102 may be determined to have the first UE type in step 1710 if the PRACH configuration of the received random access preamble is determined to be a first PRACH configuration, the UE 102 may be determined to have the second UE type in step 1712 if the PRACH configuration of the received random access preamble is determined to be a second PRACH configuration, and the first and second UE types may be different. In some aspects, the first and second UE types may be subscription types. In some aspects, the second UE type may be a mission critical (MC) UE or a multimedia priority UE. In some aspects, the second UE type may be one of a set of one or more UE types. In some aspects, the set of one or more UE types may include a mission critical (MC) UE and/or a multimedia priority UE. In some aspects, the first UE type may be one of a set of one or more different UE types.

In some aspects, the service may be determined to have the first priority in step 1710 if the PRACH configuration of the received random access preamble may be determined to be a first PRACH configuration, the service may be determined to have the second priority in step 1712 if the PRACH configuration of the received random access preamble is determined to be a second PRACH configuration, and the second priority may be higher than the first priority.

In some aspects, the service may be determined to have the first service type in step 1710 if the PRACH configuration of the received random access preamble is determined to be a first PRACH configuration, the service may be determined to have the second service type in step 1712 if the PRACH configuration of the received random access preamble is determined to be a second PRACH configuration, and the first and second service types may be different. In some aspects, the second service type may be a mission critical (MC) service. In some aspects, the second service type may be one of a set of one or more service types. In some aspects, the set of one or more service types may include a mission critical (MC) service.

In some aspects, the first network slice may be determined in step 1710 if the PRACH configuration of the received random access preamble is determined to be a first PRACH configuration, the second network slice may be determined in step 1712 if the PRACH configuration of the received random access preamble is determined to be a second PRACH configuration, and the first and second network slices may be different. In some aspects, the second network slice may be one of a set of one or more network slices.

In some aspects, the process 1700 may include an optional step 1714 in which the network node 104, in response to receiving the random access preamble, transmits a random access response (RAR). In some aspects (e.g., 2-step random access procedure aspects), the transmitted RAR may include a UE identifier assignment, timing advance information, and a contention resolution message.

In some aspects (e.g., 4-step random access procedure aspects), the process 1700 may include an optional step 1716 in which the network node 104 receives a request message in physical uplink shared channel (PUSCH) (e.g., a request message for requesting terminal identification and radio resource control (RRC) connection establishment) that was conveyed by the UE 102.

In some aspects, the process 1700 may include a step in which the network node 104 determines that the UE 102 has a third priority, the UE 102 has a third UE type, the service has the third priority, the service has a third service type, and/or a third network slice if the PRACH configuration of the received random access preamble is determined to be a third PRACH configuration. In some aspects, the first, second, and third random access preamble configurations may be different, and the third priority may be higher than the first and second priorities. In some aspects, the process 1700 may further include transmitting a system information block including the first, second, and third PRACH configurations.

In some aspects, PRACH occasions of the first PRACH configuration may be separated from PRACH occasions of the second PRACH configuration in the time domain (e.g., as shown in FIG. 10), and the step 1708 of determining the PRACH configuration of the received random access preamble may include determining a time domain of a PRACH occasion in which the received random access preamble was transmitted. In some aspects, a PRACH configuration index parameter in a system information block may indicate the PRACH occasions of the second PRACH configuration.

In some aspects, PRACH occasions of the first PRACH configuration may be separated from PRACH occasions of the second PRACH configuration in the frequency domain (e.g., as shown in FIGS. 11 and 12), and the step 1708 of determining the PRACH configuration of the received random access preamble may include determining a frequency domain of a PRACH occasion in which the received random access preamble was transmitted. In some aspects, a frequency start parameter may indicate the start position in frequency for the PRACH occasions of the second PRACH configuration. In some aspects, a frequency division multiplexing parameter may indicate the number of PRACH occasions of the second PRACH configuration frequency division multiplexed at one time instance. In some aspects, PRACH occasions of the first PRACH configuration and PRACH occasions of the second PRACH configuration may be consecutive in the frequency domain at one time instance (e.g., as shown in FIG. 12).

In some aspects, the first PRACH configuration may have a first periodicity, the second PRACH configuration may have a second periodicity, and the first and second periodicities may be different. In some aspects, the second periodicity may be shorter than the first periodicity. In some aspects, the first PRACH configuration may have a first preamble format, the second PRACH configuration may have a second preamble format, and the first and second preamble formats may be different. In some aspects, the second preamble format may have longer sequence length than the first preamble format. In some aspects, the step 1808 of determining the PRACH configuration of the received random access preamble may include determining a periodicity and/or preamble format with which the received random access preamble was transmitted.

In some aspects, the first PRACH configuration may have a first set of preamble indexes per PRACH occasion, the second PRACH configuration may have a second set of preamble indexes per PRACH occasion, the first and second sets of preamble indexes may not overlap (e.g., as shown in FIGS. 13 and 14). In some aspects, the step 17708 of determining the PRACH configuration of the received random access preamble may include determining whether a preamble index of the received random access preamble is in the first set or the second set. In some aspects, the first set of preamble indexes may be preamble indexes in preamble group A for contention based random access, and the second set of preamble indexes may be preamble indexes in preamble group B for contention based random access (e.g., as shown in FIG. 13). In some aspects, a first parameter may indicate a total number of preamble indexes in the first set, and a second parameter may indicate a total number of preamble indexes in the second set (e.g., as shown in FIG. 14). In some aspects, a value of the second parameter may be evenly dividable by a number of synchronization signals/physical broadcast channel blocks (SSBs). In some aspects, a value of the first parameter plus a value of the second parameter may be less than or equal to 64.

In some aspects, the first PRACH configuration may include a first set of preambles, the second PRACH configuration may include a second set of preambles, and the first and second sets may be mutually exclusive. In some aspects, the step 1708 of determining the PRACH configuration of the received random access preamble may include determining whether the received random access preamble is in the first set or the second set. In some aspects, the preambles of the second set may be generated using different root values and/or cyclic shift values than those used to generate the preambles of the first set.

In some aspects, a random access preamble transmitted in accordance with the second PRACH configuration may be transmitted at a higher power than a random access preamble transmitted in accordance with the first PRACH configuration. In some aspects, a parameter in the first and second PRACH configurations may indicate the power at which the random access preamble is transmitted. In some aspects, the step 1708 of determining the PRACH configuration of the received random access preamble may include determining the power at which the received random access preamble was transmitted.

In some aspects, the process 1700 may further include receiving an explicit indication of a priority of the UE 102, a type of the UE 102, a priority of the service, a type of the service, and/or a network slice identification (ID). The explicit indication may have been transmitted by the UE and received with the random access preamble, and the PRACH configuration of the received random access preamble may be determined in step 1708 using the explicit indication. In some aspects, the explicit indication may include a UE access identification, an alarm type, a service type, and/or UE position information.

In some aspects, the random access preamble may be determined to have the second PRACH configuration in step 1708 if an associated physical uplink shared channel (PUSCH) was transmitted using a PUSCH resource reserved for a set of one or more UE types, one or more US priorities, one or more service types, one or more service priorities, and/or one or more network slices. In some aspects, the reserved PUSCH resource may include: (i) a demodulation reference signal (DMRS) resource for msgA PUSCH including a DMRS port and/or a DMRS sequence, (ii) a time and/or frequency resource for msgA PUSCH, (iii) power control related parameters for msgA PUSCH including a power ramping step size, a power ramping counter, a power offset relative to the preamble received target power, a power scaling factor for scaling an estimated path loss, and/or a transmit power command (TPC), (iv) a listen before talk (LBT) type of msgA PUSCH, (v) a cyclic prefix (CP) extension of msgA PUSCH, (vi) a frequency hopping configuration of msgA PUSCH, (vii) a waveform of msgA PUSCH, (viii) an interlace configuration of msgA PUSCH, and/or (ix) a modulation coding scheme (MCS) configuration of msgA PUSCH.

Figure 18:
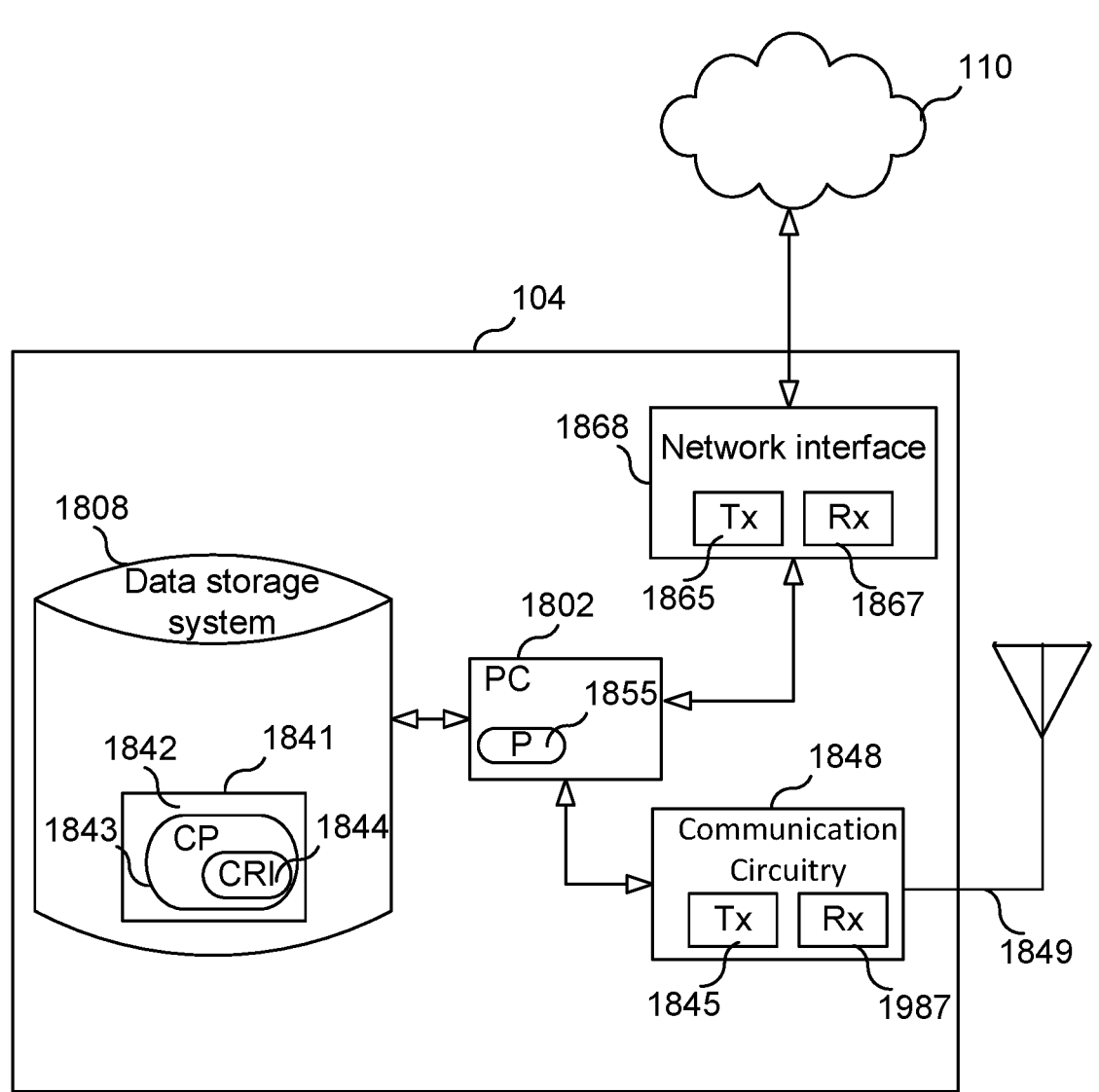
FIG. 18 is a block diagram of a network node according to some aspects.

FIG. 18 is a block diagram of a network node 104, according to some aspects. As shown in FIG. 18, the network node 104 may comprise: processing circuitry (PC) 1802, which may include one or more processors (P) 1855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., the network node 104 may be a distributed computing apparatus); a network interface 1868 comprising a transmitter (Tx) 1865 and a receiver (Rx) 1867 for enabling the network node 104 to transmit data to and receive data from other nodes connected to a network 110 (e.g., an Internet Protocol (IP) network) to which network interface 1868 is connected; communication circuitry 1848, which is coupled to an antenna arrangement 1849 comprising one or more antennas and which comprises a transmitter (Tx) 1845 and a receiver (Rx) 1847 for enabling the network node 104 to transmit data and receive data (e.g., wirelessly transmit/receive data); and a local storage unit (a.k.a., "data storage system") 1808, which may include one or more non-volatile storage devices and/or one or more volatile storage devices. In aspects where PC 1802 includes a programmable processor, a computer program product (CPP) 1841 may be provided. CPP 1841 includes a computer readable medium (CRM) 1842 storing a computer program (CP) 1843 comprising computer readable instructions (CRI) 1844. CRM 1842 may be a non-transitory computer readable medium, such as, magnetic media (e.g., a hard disk), optical media, memory devices (e.g., random access memory, flash memory), and the like. In some aspects, the CRI 1844 of computer program 1843 is configured such that when executed by PC 1802, the CRI causes the network node 104 to perform steps described herein (e.g., steps described herein with reference to the flow charts). In other aspects, the network node 104 may be configured to perform steps described herein without the need for code. That is, for example, PC 1802 may consist merely of one or more ASICs. Hence, the features of the aspects described herein may be implemented in hardware and/or software.

Summary of Embodiments

A1. A method (1500) performed by a user equipment (UE) (102), the method comprising: selecting a physical random access channel (PRACH) configuration from a group including at least a first PRACH configuration asso-ciated with a first group and a second PRACH associated with a second group, wherein the first and second PRACH configurations are different; and transmitting a random access preamble in accordance with the selected PRACH configuration.

A2. The method of embodiment A1, further comprising transmitting a request message in physical uplink shared channel (PUSCH) with the random access preamble.

A3. The method of embodiment A1 or A2, further comprises receiving a random access response (RAR) to the transmitted random access preamble.

A4. The method of embodiment A3, wherein the RAR includes a UE identifier assignment, timing advance information, and a contention resolution message.

A5. The method of embodiment A3, further comprising, in response to receiving and successfully decoding the RAR, transmitting a request message in physical uplink shared channel (PUSCH).

A6. The method of any one of embodiments A1-A5, further comprising: receiving the first PRACH configuration; and receiving the second PRACH configuration.

A7. The method of embodiment A6, wherein the first and second PRACH configurations are received as part of a system information block.

A8. The method of any one of embodiments A1-A7, wherein the group further includes a third PRACH configuration associated with a third group, wherein the first, second, and third PRACH configurations are different.

A9. The method of embodiment A8, further comprising receiving a system information block including the first, second, and third PRACH configurations.

A10. The method of any one of embodiments A1-A9, wherein the first and second PRACH configurations are different in at least one of the following parameters: valid PRACH occasions, PRACH configuration periodicities, preamble formats, and configured preamble indexes per PRACH occasion.

A11. The method of any one of embodiments A1-A10, wherein PRACH occasions of the first PRACH configuration are separated from PRACH occasions of the second PRACH configuration in the time domain.

A12. The method of embodiment A11, wherein a PRACH configuration index parameter in a system information block indicates the PRACH occasions of the second PRACH configuration.

A13. The method of any one of embodiments A1-A12, wherein PRACH occasions of the first PRACH configuration are separated from PRACH occasions of the second PRACH configuration in the frequency domain.

A14. The method of embodiment A13, wherein a frequency start parameter indicates the start position in frequency for the PRACH occasions of the second PRACH configuration.

A15. The method of embodiment A13 or A14, wherein a frequency division multiplexing parameter indicates the number of PRACH occasions of the second PRACH configuration frequency division multiplexed at one time instance.

A16. The method of any one of embodiments A13 or A15, wherein PRACH occasions of the first PRACH configuration and PRACH occasions of the second PRACH configuration are consecutive in the frequency domain at one time instance.

A17. The method of any one of embodiments A1-A16, wherein the first PRACH configuration has a first periodicity, the second PRACH configuration has a second periodicity, and the first and second periodicities are different.

A18. The method of embodiment A17, wherein the second periodicity is shorter than the first periodicity.

A19. The method of any one of embodiments A1-A18, wherein the first PRACH configuration has a first preamble format, the second PRACH configuration has a second preamble format, and the first and second preamble formats are different.

A20. The method of embodiment A19, wherein the second preamble format has longer sequence length than the first preamble format.

A21. The method of any one of embodiments A1-A10, wherein the first PRACH configuration has a first set of preamble indexes per PRACH occasion, the second PRACH configuration has a second set of preamble indexes per PRACH occasion, and the first and second sets of preamble indexes do not overlap.

A22. The method of embodiment A21, wherein the first set of preamble indexes are preamble indexes in preamble group A for contention based random access, and the second set of preamble indexes are preamble indexes in preamble group B for contention based random access.

A23. The method of embodiment A21, wherein a first parameter indicates a total number of preamble indexes in the first set, and a second parameter indicates a total number of preamble indexes in the second set.

A24. The method of embodiment A23, wherein a value of the second parameter is evenly dividable by a number of synchronization signals/physical broadcast channel blocks (SSBs).

A25. The method of embodiment A23 or A24, wherein a value of the first parameter plus a value of the second parameter is less than or equal to 64.

A26. The method of any one or of embodiments A1-A25, wherein the first PRACH configuration includes a first set of preambles, the second PRACH configuration includes a second set of preambles, and the first and second sets are mutually exclusive.

A27. The method of embodiment A26, wherein the preambles of the second set are generated using different root values and/or cyclic shift values than those used to generate the preambles of the first set.

A28. The method of any one of embodiments A1-A27, wherein a random access preamble in accordance with the second PRACH configuration is transmitted at a higher power than a random access preamble transmitted in accordance with the first PRACH configuration.

A29. The method of embodiment A28, wherein a parameter in the first and second PRACH configurations indicates the power at which the random access preamble is transmitted.

A30. The method of any one of embodiments A1-A29, further comprising re-transmitting the random access preamble in accordance with the second PRACH configuration with a higher power than the previous transmission of the random access preamble.

A31. The method of any one of embodiments A1-A30, wherein the selection is based on a priority of the UE, a type of the UE, a priority of a service, a type of the service, and/or a network slice, and the method further comprises transmitting with the random access preamble an explicit indication of the priority of the UE, the type of the UE, the priority of the service, the type of the service, and/or a network slice identification (ID) of the network slice on which the selection is based.

A32. The method of embodiment A31, wherein the explicit indication includes a UE access identification, an alarm type, a service type, and/or UE position information.

A33. The method of any one of embodiments A1-A32, wherein transmitting the random access preamble in accordance with the second PRACH configuration comprises transmitting a physical uplink shared channel (PUSCH) using a PUSCH resource reserved for a set of one or more UE types, one or more UE priorities, one or more service types, one or more service priorities, and/or one or more network slices.

A34. The method of embodiment A33, wherein the reserved PUSCH resource comprises: (i) a demodulation reference signal (DMRS) resource for msgA PUSCH including a DMRS port and/or a DMRS sequence, (ii) a time and/or frequency resource for msgA PUSCH, (iii) power control related parameters for msgA PUSCH including a power ramping step size, a power ramping counter, a power offset relative to the preamble received target power, a power scaling factor for scaling an estimated path loss, and/or a transmit power command (TPC), (iv) a listen before talk (LBT) type of msgA PUSCH, (v) a cyclic prefix (CP) extension of msgA PUSCH, (vi) a frequency hopping configuration of msgA PUSCH, (vii) a waveform of msgA PUSCH, (viii) an interlace configuration of msgA PUSCH, and/or (ix) a modulation coding scheme (MCS) configuration of msgA PUSCH.

A35. The method of any one of embodiments A1-A34, wherein the selection is based on a priority of the UE, a type of the UE, a priority of a service, a type of the service, and/or a network slice.

A36. The method of any one of embodiments A1-A35, wherein the selection is based on a priority of the UE.

A37. The method of embodiment A36, wherein the first group is associated with a first priority, the second group is associated with a second priority, the second priority is higher than the first priority, the first PRACH configuration is selected if the UE has the first priority, and the second PRACH configuration is selected if the UE has the second priority.

A38. The method of any one of embodiments A1-A35, wherein the selection is based on a type of the UE.

A39. The method of embodiment A38, wherein the second group is associated with a set of one or more UE types, and the second PRACH configuration is selected if the type of the UE is within the set of one or more UE types.

A40. The method of embodiment A38 or A39, wherein the type of the UE is a subscription type.

A41. The method of embodiment A39 or A40, wherein the set of one or more UE types includes a mission critical (MC) UE and/or a multimedia priority UE.

A42. The method of any one of embodiments A1-A35, wherein the method is for establishing a connection with a network node (104) to obtain a service.

A43. The method of embodiment A42, wherein the selection is based on a priority of the service.

A44. The method of embodiment A43, wherein the first group is associated with a first priority, the second group is associated with a second priority, the second priority is higher than the first priority, the first PRACH configuration is selected if the service has the first priority, and the second PRACH configuration is selected if the service has the second priority.

A45. The method of any one of embodiments A1-A35, wherein the selection is based on a type of the service.

A46. The method of embodiment A45, wherein the second group is associated with a set of one or more service types, and the second PRACH configuration is selected if the type of the service is within the set of one or more service types.

A47. The method of embodiment A45 or A46, wherein the type of the service is one of an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, or an air-to-ground communication (A2G) service.

A48. The method of embodiment A46 or A47, wherein the set of one or more service types includes a mission critical (MC) service.

A49. The method of any one of embodiments A42-A48, wherein the service is an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, and/or an air-to-ground communication (A2G) service.

A50. The method of any one of embodiments A1-A35, wherein the selection is based on a network slice identification (ID).

A51. The method of embodiment A50, the second group is associated with a set of one or more network slice IDs, and the second PRACH configuration is selected if the network slice ID is within the set of one or more network slice IDs.

B1. A user equipment (UE) (102) adapted to: select a physical random access channel (PRACH) configuration from a group including at least a first PRACH configuration associated with a first group and a second PRACH configuration associated with a second group, wherein the first and second PRACH configurations are different; and transmit a random access preamble in accordance with the selected PRACH configuration.

C1. A method (1700) performed by a network node (104), the method comprising: receiving a random access preamble transmitted by a user equipment (UE) (102); determining a physical random access channel (PRACH) configuration that was used by the UE to transmit the random access preamble; determining that the UE has a first priority, the UE has a first UE type, a service has the first priority, the service has a first service type, and/or a first network slice if the PRACH configuration of the received random access preamble is determined to be a first PRACH configuration; and determining that the UE has a second priority, the UE has a second UE type, the service has the second priority, the service has a second service type, and/or a second network slice if the PRACH configuration of the received random access preamble is determined to be a second PRACH configuration, wherein the first and second PRACH configurations are different.

C2. The method of embodiment C1, further comprising receiving a request message in physical uplink shared channel (PUSCH) with the random access preamble.

C3. The method of embodiment C1 or C2, further comprises, in response to receiving the random access preamble, transmitting a random access response (RAR).

C4. The method of embodiment C3, wherein the transmitted RAR includes a UE identifier assignment, timing advance information, and a contention resolution message.

C5. The method of embodiment C3, further comprising receiving a request that were conveyed by the UE in physical uplink shared channel (PUSCH).

C6. The method of any one of embodiments C1-C5, further comprising: transmitting the first PRACH configuration; and transmitting the second PRACH configuration.

C7. The method of embodiment C6, wherein the first and second PRACH configurations are transmitted as part of a system information block.

C8. The method of any one of embodiments C1-C7, further comprising determining that the UE has a third priority, the UE has a third UE type, the service has the third priority, the service has a third service type, and/or a third network slice if the PRACH configuration of the received random access preamble is determined to be a third PRACH configuration, wherein the first, second, and third random access preamble configurations are different.

C9. The method of embodiment C8, further comprising transmitting a system information block including the first, second, and third PRACH configurations.

C10. The method of any one of embodiments C1-C9, wherein the first and second PRACH configurations are different in at least one of the following parameters: valid PRACH occasions, PRACH configuration periodicities, preamble formats, and configured preamble indexes per random access occasion.

C11. The method of any one of embodiments C1-C10, wherein PRACH occasions of the first PRACH configuration are separated from PRACH occasions of the second PRACH configuration in the time domain, and determining the PRACH configuration of the received random access preamble comprises determining a time domain of a PRACH occasion in which the received random access preamble was transmitted.

C12. The method of embodiment C11, wherein a PRACH configuration index parameter in a system information block indicates the PRACH occasions of the second PRACH configuration.

C13. The method of any one of embodiments C1-C12, wherein PRACH occasions of the first PRACH configuration are separated from PRACH occasions of the second PRACH configuration in the frequency domain, and determining the PRACH configuration of the received random access preamble comprises determining a frequency domain of a PRACH occasion in which the received random access preamble was transmitted.

C14. The method of embodiment C13, wherein a frequency start parameter indicates the start position in frequency for the PRACH occasions of the second PRACH configuration.

C15. The method of embodiment C13 or C14, wherein a frequency division multiplexing parameter indicates the number of PRACH occasions of the second PRACH configuration frequency division multiplexed at one time instance.

C16. The method of any one of embodiments C13-C15, wherein PRACH occasions of the first PRACH configuration and PRACH occasions of the second PRACH configuration are consecutive in the frequency domain at one time instance.

C17. The method of any one of embodiments C1-C16, wherein the first PRACH configuration has a first periodicity, the second PRACH configuration has a second periodicity, and the first and second periodicities are different.

C18. The method of embodiment C17, wherein the second periodicity is shorter than the first periodicity.

C19. The method of any one of embodiments C1-C18, wherein the first PRACH configuration has a first preamble format, the second PRACH configuration has a second preamble format, and the first and second preamble formats are different.

C20. The method of embodiment C19, wherein the second preamble format has longer sequence length than the first preamble format.

C21. The method of any one of embodiments C1-C20, wherein the first PRACH configuration has a first set of preamble indexes per PRACH occasion, the second PRACH configuration has a second set of preamble indexes per PRACH occasion, the first and second sets of preamble indexes do not overlap, and determining the PRACH configuration of the received random access preamble comprises determining whether a preamble index of the received random access preamble is in the first set or the second set.

C22. The method of embodiment C21, wherein the first set of preamble indexes are preamble indexes in preamble group A for contention based random access, and the second set of preamble indexes are preamble indexes in preamble group B for contention based random access.

C23. The method of embodiment C21, wherein a first parameter indicates a total number of preamble indexes in the first set, and a second parameter indicates a total number of preamble indexes in the second set.

C24. The method of embodiment C23, wherein a value of the second parameter is evenly dividable by a number of synchronization signals/physical broadcast channel blocks (SSBs).

C25. The method of embodiment C23 or C24, wherein a value of the first parameter plus a value of the second parameter is less than or equal to 64.

C26. The method of any one or of embodiments C1-C25, wherein the first PRACH configuration includes a first set of preambles, the second PRACH configuration includes a second set of preambles, the first and second sets are mutually exclusive, and determining the PRACH configuration of the received random access preamble comprises determining whether the received random access preamble is in the first set or the second set.

C27. The method of embodiment C26, wherein the preambles of the second set are generated using different root values and/or cyclic shift values than those used to generate the preambles of the first set.

C28. The method of any one of embodiments C1-C27, wherein a random access preamble transmitted in accordance with the second PRACH configuration is transmitted at a higher power than a random access preamble transmitted in accordance with the first PRACH configuration.

C29. The method of embodiment C28, wherein a parameter in the first and second PRACH configurations indicates the power at which the random access preamble transmitted.

C30. The method of any one of embodiments C1-C29, further comprising receiving an explicit indication of a priority of the UE, a type of the UE, a priority of the service, a type of the service, and/or a network slice identification (ID), wherein the explicit indication was transmitted by the UE and received with the random access preamble, and the PRACH configuration of the received random access preamble is determined using the explicit indication.

C31. The method of embodiment C30, wherein the explicit indication includes a UE access identification, an alarm type, a service type, and/or UE position information.

C32. The method of any one of embodiments C1-C31, wherein the random access preamble is determined to have the second PRACH configuration if an associated physical uplink shared channel (PUSCH) was transmitted using a PUSCH resource reserved for a set of one or more UE types, one or more UE priorities, one or more service types, one or more service priorities, and/or one or more network slices.

C33. The method of embodiment C32, wherein the reserved PUSCH resource comprises: (i) a demodulation reference signal (DMRS) resource for msgA PUSCH including a DMRS port and/or a DMRS sequence, (ii) a time and/or frequency resource for msgA PUSCH, (iii) power control related parameters for msgA PUSCH including a power ramping step size, a power ramping counter, a power offset relative to the preamble received target power, a power scaling factor for scaling an estimated path loss, and/or a transmit power command (TPC), (iv) a listen before talk (LBT) type of msgA PUSCH, (v) a cyclic prefix (CP) extension of msgA PUSCH, (vi) a frequency hopping configuration of msgA PUSCH, (vii) a waveform of msgA PUSCH, (viii) an interlace configuration of msgA PUSCH, and/or (ix) a modulation coding scheme (MCS) configuration of msgA PUSCH.

C34. The method of any one of embodiments C1-C33, wherein the UE is attempting to establish a connection with the network node to obtain the service.

C35. The method of any one of embodiments C1-C34, wherein the UE is determined to have the first priority if the PRACH configuration of the received random access preamble is determined to be a first PRACH configuration, the UE is determined to have the second priority if the PRACH configuration of the received random access preamble is determined to be a second PRACH configuration, and the second priority is higher than the first priority.

C36. The method of any one of embodiments C1-C34, wherein the UE is determined to have the first UE type if the PRACH configuration of the received random access preamble is determined to be a first PRACH configuration, the UE is determined to have the second UE type if the PRACH configuration of the received random access preamble is determined to be a second PRACH configuration, and the first and second UE types are different.

C37. The method of embodiment C36, wherein the first and second UE types are subscription types.

C38. The method of embodiment C36 or C37, wherein the second UE type is a mission critical (MC) UE or a multimedia priority UE.

C39. The method of embodiment C36 or C37, wherein the second UE type is one of a set of one or more UE types.

C40. The method of embodiment C39, wherein the set of one or more UE types includes a mission critical (MC) UE and/or a multimedia priority UE.

C41. The method of any one of embodiments C1-C34, wherein the service is determined to have the first priority if the PRACH configuration of the received random access preamble is determined to be a first PRACH configuration, the is determined to have the second priority if the PRACH configuration of the received random access preamble is determined to be a second PRACH configuration, and the second priority is higher than the first priority.

C42. The method of any one of embodiments C1-C34, wherein the service is determined to have the first service type if the PRACH configuration of the received random access preamble is determined to be a first PRACH configuration, the service is determined to have the second service type if the PRACH configuration of the received random access preamble is determined to be a second PRACH configuration, and the first and second service types are different.

C43. The method of embodiment C42, wherein the second service type is a mission critical (MC) service.

C44. The method of embodiment C42 or C43, wherein the second service type is one of a set of one or more service types.

C45. The method of embodiment C44, wherein the set of one or more service types includes a mission critical (MC) service.

C46. The method of any one of embodiments C1-C34, wherein the first network slice is determined if the PRACH configuration of the received random access preamble is determined to be a first PRACH configuration, the second network slice is determined if the PRACH configuration of the received random access preamble is determined to be a second PRACH configuration, and the first and second network slices are different.

C47. The method of embodiment C46, wherein the second network slice is one of a set of one or more network slices.

C48. The method of any one of embodiments C1-C47, wherein the service is an emergency call, a mission critical (MC) service, a multimedia priority service, a mobile broadband (MBB) service, an enhanced mobile broadband (eMBB) service, a vehicle-to-everything (V2X) service, a television broadcast, a small data transmission (SDT) service, or an air-to-ground communication (A2G) service.

D1. A network node (104) adapted to: receive a random access preamble transmitted by a user equipment (UE) (102); determine a physical random access channel (PRACH) configuration that was used by the UE to transmit the random access preamble; determine that the UE has a first priority, the UE has a first UE type, a service has the first priority, the service has a first service type, and/or a first network slice if the PRACH configuration of the received random access preamble is determined to be a first PRACH configuration; and determine that the UE has a second priority, the UE has a second UE type, the service has the second priority, the service has a second service type, and/or a second network slice if the PRACH configuration of the received random access preamble is determined to be a second PRACH configuration, wherein the first and second PRACH configurations are different.

E1. A computer program comprising instructions for adapting an apparatus to perform the method of any one of embodiments A1-A51 and C1-C48.

F1. A carrier containing the computer program of embodiment E1, wherein the carrier is one of an electronic signal, optical signal, radio signal, or compute readable storage medium.

G1. An apparatus (102 or 104), the apparatus comprising: processing circuitry (1602 or 1902); and a memory (1642 or 1942), said memory containing instructions (1644 or 1944) executable by said processing circuitry, whereby said apparatus is operative to perform the method of any one of the embodiments A1-A51 and C1-C48.

H1. An apparatus (102 or 104) adapted to perform the method of any one of embodiments A1-A51 and C1-C48.

I1. Any combination of the embodiments set forth above.

J1. A method (1500) performed by a user equipment (UE) (102), the method comprising: selecting a physical random access channel (PRACH) configuration from a group including at least a first PRACH configuration associated with a first priority and a second PRACH associated with a second priority, wherein the first and second PRACH configurations are different, the second priority is higher than the first priority, and the selection is based on a priority of the UE; and transmitting a random access preamble in accordance with the selected PRACH configuration.

K1. A user equipment (UE) (102) adapted to: select a physical random access channel (PRACH) configuration from a group including at least a first PRACH configuration associated with a first priority and a second PRACH configuration associated with a second priority, wherein the first and second PRACH configurations are different, the second priority is higher than the first priority, and the selection is based on a priority of the UE; and transmit a random access preamble in accordance with the selected PRACH configuration.

L1. A method (1800) performed by a network node (104), the method comprising: receiving a random access preamble transmitted by a user equipment (UE) (102); determining a PRACH configuration that was used by the UE to transmit the random access preamble; determining that the UE has a first priority if the PRACH configuration of the received random access preamble is determined to be a first PRACH configuration; and determining that the UE has a second priority if the PRACH configuration of the received random access preamble is determined to be a second PRACH configuration, wherein the first and second PRACH configurations are different, and the second priority is higher than the first priority.

M1. A network node (104) adapted to: receive a random access preamble transmitted by a user equipment (UE) (102); determine a physical random access channel (PRACH) configuration that was used by the UE to transmit the random access preamble; determine that the UE has a first priority if the PRACH configuration of the received random access preamble is determined to be a first PRACH configuration; and determine that the UE has a second priority if the PRACH configuration of the received random access preamble is determined to be a second PRACH configuration, wherein the first and second PRACH configurations are different, and the second priority is higher than the first priority.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:
   selecting a physical random access channel (PRACH) configuration from a group including at least a first PRACH configuration associated with a first group and a second PRACH configuration associated with a second group, wherein the first and second PRACH configurations are different, the first PRACH configuration has a first set of preamble indexes per PRACH occasion, the second PRACH configuration has a second set of preamble indexes per PRACH occasion, the first and second sets of preamble indexes do not overlap, and the selection is based on a priority of the UE and/or a type of the UE; and
   transmitting a random access preamble in accordance with the selected PRACH configuration as part of a contention based random access procedure.

2. The method of claim 1, wherein PRACH occasions of the first PRACH configuration are separated from PRACH occasions of the second PRACH configuration in the time domain.

3. The method of claim 1, wherein PRACH occasions of the first PRACH configuration are separated from PRACH occasions of the second PRACH configuration in the frequency domain.

4. The method of claim 1, wherein the method includes at least one of the following features:

the first PRACH configuration has a first periodicity, the second PRACH configuration has a second periodicity, and the first and second periodicities are different; and the first PRACH configuration has a first preamble format, the second PRACH configuration has a second preamble format, and the first and second preamble formats are different.

5. The method of claim 1, wherein the first set of preamble indexes are preamble indexes in preamble group A for contention based random access, and the second set of preamble indexes are preamble indexes in preamble group B for contention based random access.

6. The method of claim 1, wherein a first parameter indicates a total number of preamble indexes in the first set, and a second parameter indicates a total number of preamble indexes in the second set.

7. The method of claim 1, wherein the first PRACH configuration includes a first set of preambles, the second PRACH configuration includes a second set of preambles, and the first and second sets are mutually exclusive.

8. The method of claim 1, wherein a random access preamble in accordance with the second PRACH configuration is transmitted at a higher power than a random access preamble transmitted in accordance with the first PRACH configuration.

9. The method of claim 1, wherein the method further comprises transmitting with the random access preamble an explicit indication of the priority of the UE and/or the type of the UE on which the selection is based.

10. The method of claim 1, wherein transmitting the random access preamble in accordance with the selected PRACH configuration comprises transmitting a physical uplink shared channel (PUSCH) using a PUSCH resource reserved for a set of one or more UE types and/or one or more UE priorities.

11. The method of claim 1, wherein the selection is based on a priority of the UE, the first group is associated with a first priority, the second group is associated with a second priority, the second priority is higher than the first priority, the first PRACH configuration is selected if the UE has the first priority, and the second PRACH configuration is selected if the UE has the second priority.

12. A user equipment (UE) adapted to:

select a physical random access channel (PRACH) configuration from a group including at least a first PRACH configuration associated with a first group and a second PRACH configuration associated with a second group, wherein the first and second PRACH configurations are different, the first PRACH configuration has a first set of preamble indexes per PRACH occasion, the second PRACH configuration has a second set of preamble indexes per PRACH occasion, the first and second sets of preamble indexes do not overlap, and the selection is based on a priority of the UE and/or a type of the UE; and transmit a random access preamble in accordance with the selected PRACH configuration as part of a contention based random access procedure.

13. A method performed by a network node, the method comprising:

receiving a random access preamble transmitted by a user equipment (UE) as part of a contention based random access procedure;

determining a physical random access channel (PRACH) configuration that was used by the UE to transmit the random access preamble;

determining that the UE has a first priority and/or a first UE type if the PRACH configuration of the received random access preamble is determined to be a first PRACH configuration; and determining that the UE has a second priority and/or a second UE type if the PRACH configuration of the received random access preamble is determined to be a second PRACH configuration, wherein the first and second PRACH configurations are different, the first PRACH configuration has a first set of preamble indexes per PRACH occasion, the second PRACH configuration has a second set of preamble indexes per PRACH occasion, the first and second sets of preamble indexes do not overlap, and determining the PRACH configuration of the received random access preamble comprises determining whether a preamble index of the received random access preamble is in the first set or the second set.

14. The method of claim 13, wherein PRACH occasions of the first PRACH configuration are separated from PRACH occasions of the second PRACH configuration in the time domain, and determining the PRACH configuration of the received random access preamble comprises determining a time domain of a PRACH occasion in which the received random access preamble was transmitted.

15. The method of claim 13, wherein PRACH occasions of the first PRACH configuration are separated from PRACH occasions of the second PRACH configuration in the frequency domain, and determining the PRACH configuration of the received random access preamble comprises determining a frequency domain of a PRACH occasion in which the received random access preamble was transmitted.

16. The method of claim 13, wherein the first PRACH configuration includes a first set of preambles, the second PRACH configuration includes a second set of preambles, the first and second sets are mutually exclusive, and determining the PRACH configuration of the received random access preamble comprises determining whether the received random access preamble is in the first set or the second set.

17. The method of claim 13, further comprising receiving an explicit indication of a priority of the UE and/or a type of the UE, wherein the explicit indication was transmitted by the UE and received with the random access preamble, and the PRACH configuration of the received random access preamble is determined using the explicit indication.

18. The method of claim 13, wherein the random access preamble is determined to have the second PRACH configuration if an associated physical uplink shared channel (PUSCH) was transmitted using a PUSCH resource reserved for a set of one or more UE types and/or one or more UE priorities.

19. The method of claim 13, wherein the UE is determined to have the first priority if the PRACH configuration of the received random access preamble is determined to be a first PRACH configuration, the UE is determined to have the second priority if the PRACH configuration of the received random access preamble is determined to be a second PRACH configuration, and the second priority is higher than the first priority.

20. A network node adapted to:

receive a random access preamble transmitted by a user equipment (UE) as part of a contention based random access procedure;

determine a physical random access channel (PRACH) configuration that was used by the UE to transmit the random access preamble;

determine that the UE has a first priority and/or a first UE type if the PRACH configuration of the received random access preamble is determined to be a first PRACH configuration; and determine that the UE has a second priority and/or a second UE type if the PRACH configuration of the received random access preamble is determined to be a second PRACH configuration, wherein the first and second PRACH configurations are different, the first PRACH configuration has a first set of preamble indexes per PRACH occasion, the second PRACH configuration has a second set of preamble indexes per PRACH occasion, the first and second sets of preamble indexes do not overlap, and determining the PRACH configuration of the received random access preamble comprises determining whether a preamble index of the received random access preamble is in the first set or the second set.

\* \* \* \* \*